United States Patent
Anegawa et al.

(10) Patent No.: US 11,198,246 B2
(45) Date of Patent: Dec. 14, 2021

(54) METHOD OF FORMING THREE-DIMENSIONAL OBJECT AND THREE-DIMENSIONAL FORMING APPARATUS

(71) Applicant: Seiko Epson Corporation, Tokyo (JP)

(72) Inventors: Kenta Anegawa, Matsumoto (JP); Daizo Aoyagi, Shiojiri (JP); Yusuke Watanabe, Shiojiri (JP)

(73) Assignee: Seiko Epson Corporation

( * ) Notice: Subject to any disclaimer, the term of this patent is extended or adjusted under 35 U.S.C. 154(b) by 289 days.

(21) Appl. No.: 16/452,759

(22) Filed: Jun. 26, 2019

(65) Prior Publication Data
US 2020/0001523 A1 Jan. 2, 2020

(30) Foreign Application Priority Data
Jun. 27, 2018 (JP) .............................. JP2018-121421

(51) Int. Cl.
| | |
|---|---|
| *B29C 64/118* | (2017.01) |
| *B33Y 10/00* | (2015.01) |
| *B33Y 30/00* | (2015.01) |
| *B33Y 50/02* | (2015.01) |
| *B29C 64/20* | (2017.01) |

(Continued)

(52) U.S. Cl.
CPC .......... *B29C 64/118* (2017.08); *B29C 64/20* (2017.08); *B29C 64/393* (2017.08); *B33Y 10/00* (2014.12); *B33Y 30/00* (2014.12); *B33Y 50/02* (2014.12); *B29K 2055/02* (2013.01); *B33Y 70/00* (2014.12)

(58) Field of Classification Search
CPC ..... B29C 64/118; B29C 64/20; B29C 64/393; B33Y 10/00; B33Y 30/00; B33Y 50/02; B33Y 70/00; B29K 2055/02
See application file for complete search history.

(56) References Cited

U.S. PATENT DOCUMENTS

| | | | |
|---|---|---|---|
| 2006/0158456 A1* | 7/2006 | Zinniel | B29C 64/188 345/589 |
| 2017/0210069 A1* | 7/2017 | Stubenruss | B29C 64/118 |

FOREIGN PATENT DOCUMENTS

| | | |
|---|---|---|
| JP | H05-154924 A | 6/1993 |
| JP | 2006-192710 A | 7/2006 |

(Continued)

OTHER PUBLICATIONS

Extended European Search Report for Patent Application No. EP 19182672.6 dated Nov. 4, 2019 (8 pages).

*Primary Examiner* — Yung-Sheng M Tsui
(74) *Attorney, Agent, or Firm* — Harness, Dickey & Pierce, P.L.C.

(57) ABSTRACT

The method of forming a three-dimensional object includes: a first forming process of causing a nozzle to eject a forming material onto a forming surface of a forming base and forming a first portion and a second portion such that the first portion and the second portion are away from each other in a first direction in parallel to the forming surface; a curing process of curing the first portion and the second portion; and a second forming process of causing the nozzle to eject the forming material between the first portion and the second portion and forming a third portion that has a shape that successively connects an end surface of the first portion in the first direction to an end surface of the second portion in the first direction, after the curing process.

9 Claims, 15 Drawing Sheets

(51) Int. Cl.
  *B29C 64/393*  (2017.01)
  *B33Y 70/00*  (2020.01)
  *B29K 55/02*  (2006.01)

(56) References Cited

FOREIGN PATENT DOCUMENTS

JP         2016-036983 A     3/2016
WO    WO-2016-061060 A1    4/2016
WO    WO-2016061060 A1 *  4/2016   ........... B29C 64/118

* cited by examiner

METHOD OF FORMING THREE-DIMENSIONAL OBJECT AND THREE-DIMENSIONAL FORMING APPARATUS

The present application is based on, and claims priority from, JP Application Serial Number 2018-121421, filed Jun. 27, 2018, the disclosure of which is hereby incorporated by reference herein in its entirety.

BACKGROUND

1. Technical Field

The present disclosure relates to a three-dimensional forming apparatus, a method of forming a three-dimensional object, and a three-dimensional forming apparatus.

2. Related Art

For example, JP-A-2006-192710 discloses a method of forming a three-dimensional object, in which a melted thermoplastic material is extruded from an extruding nozzle that scans the material in accordance with present shape data to a base and a further melted material is laminated on the material cured on the base.

According to the method of forming a three-dimensional object disclosed in JP-A-2006-192710, there is a probability that warpage occurs due to contraction when the melted material is cured and it is not possible to create a three-dimensional object with a desired shape.

SUMMARY

According to an aspect of the disclosure, a method of forming a three-dimensional object is provided. The method of forming a three-dimensional object includes: a first forming process of causing a nozzle to eject a forming material onto a forming surface of a forming base and forming a first portion and a second portion such that the first portion and the second portion are away from each other in a first direction in parallel to the forming surface; a curing process of curing the first portion and the second portion; and a second forming process of causing the nozzle to eject the forming material between the first portion and the second portion and forming a third portion that has a shape that successively connects an end surface of the first portion in the first direction to an end surface of the second portion in the first direction, after the curing process.

DESCRIPTION OF EXEMPLARY EMBODIMENTS

A. First Embodiment

Figure 1:
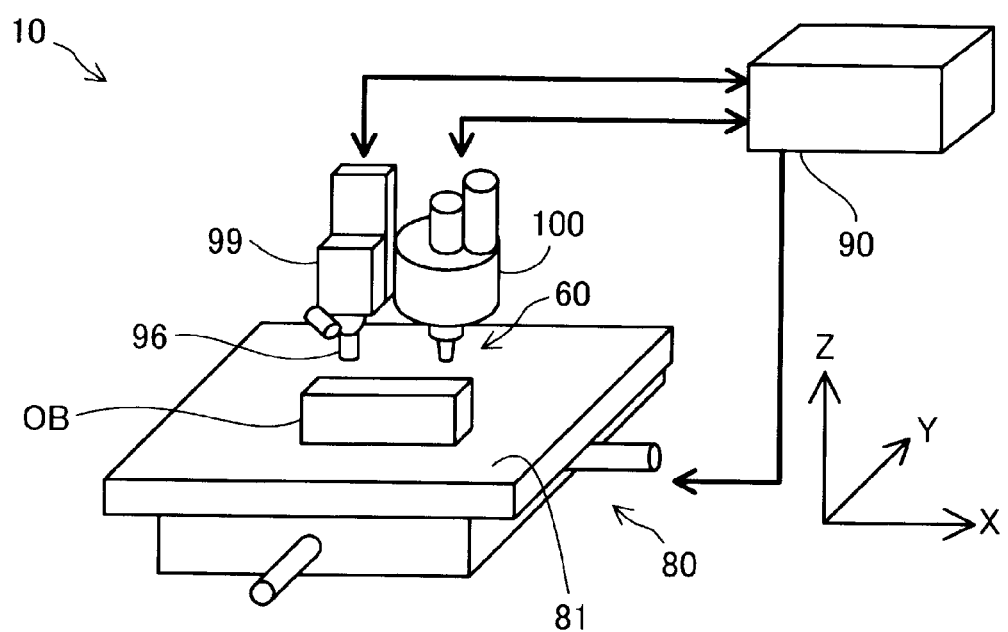
FIG. 1 is a diagram illustrating a schematic configuration of a three-dimensional forming apparatus according to a first embodiment.

FIG. 1 is a diagram illustrating a schematic configuration of a three-dimensional forming apparatus 10 according to a first embodiment. The three-dimensional forming apparatus 10 according to the embodiment includes a controller 90, a forming base 81, a moving mechanism 80, a forming unit 100, and a cutting unit 99. Hereinafter, a three-dimensional object may simply be referred to as an "object". In FIG. 1, arrows representing X, Y, and Z directions that perpendicularly intersect one another are illustrated. The X direction and the Y direction are directions in parallel to a horizontal plane, and the Z direction is a direction that is opposite to a vertical direction. The arrows representing the X, Y, and Z directions are appropriately illustrated such that the directions in the drawing correspond to those in FIG. 1 in other diagrams.

The three-dimensional forming apparatus 10 laminates a forming material by the forming unit 100 and forms an object on the forming base 81 that is moved by the moving mechanism 80. FIG. 1 schematically illustrates a state in which the object OB is formed on the forming base 81.

The controller 90 is a control device that controls operations of the forming unit 100, the cutting unit 99, and the moving mechanism 80 such that a forming process of forming an object is executed. The operations include movement of three-dimensional relative positions of the forming unit 100 and the cutting unit 99 relative to the forming base 81.

In the embodiment, the controller 90 is configured by a computer including one or more processors, a main storage device, and an input/output interface that inputs and outputs a signal to and from an external device. The controller 90 exhibits various functions by the processor executing a program or a command read to the main storage device. Instead being configured by the computer, the controller 90 may be realized by a configuration in which plural circuits for realizing at least a part of the functions are combined.

The forming base 81 is a flat plate-shaped member on which the forming material is deposited. The forming base 81 is disposed at a position facing an ejecting portion 60 of the forming unit 100. The moving mechanism 80 is a moving portion that changes a relative positional relationship between the ejecting portion 60 and the forming base 81 under the control of the controller 90. The moving mechanism 80 is configured by a three-axis positioner that moves the forming base 81 in the three axis directions as the X, Y, and Z directions using driving forces of three motors.

The cutting unit 99 is a cutting device that cuts the object OB by rotating a cutting tool 96 attached to a shaft of a head tip. As the cutting tool 96, for example, a flat end mill or a ball end mill can be adopted. The cutting unit 99 detects a position of a tip of the cutting tool 96 with a general position detection sensor and transmits the detection result to the controller 90. The controller 90 performs cutting by controlling a relative positional relationship between the cutting tool 96 and the object OB using the moving mechanism 80 described below. The cutting unit 99 may be provided with a static eliminator such as an ionizer.

Figure 2:
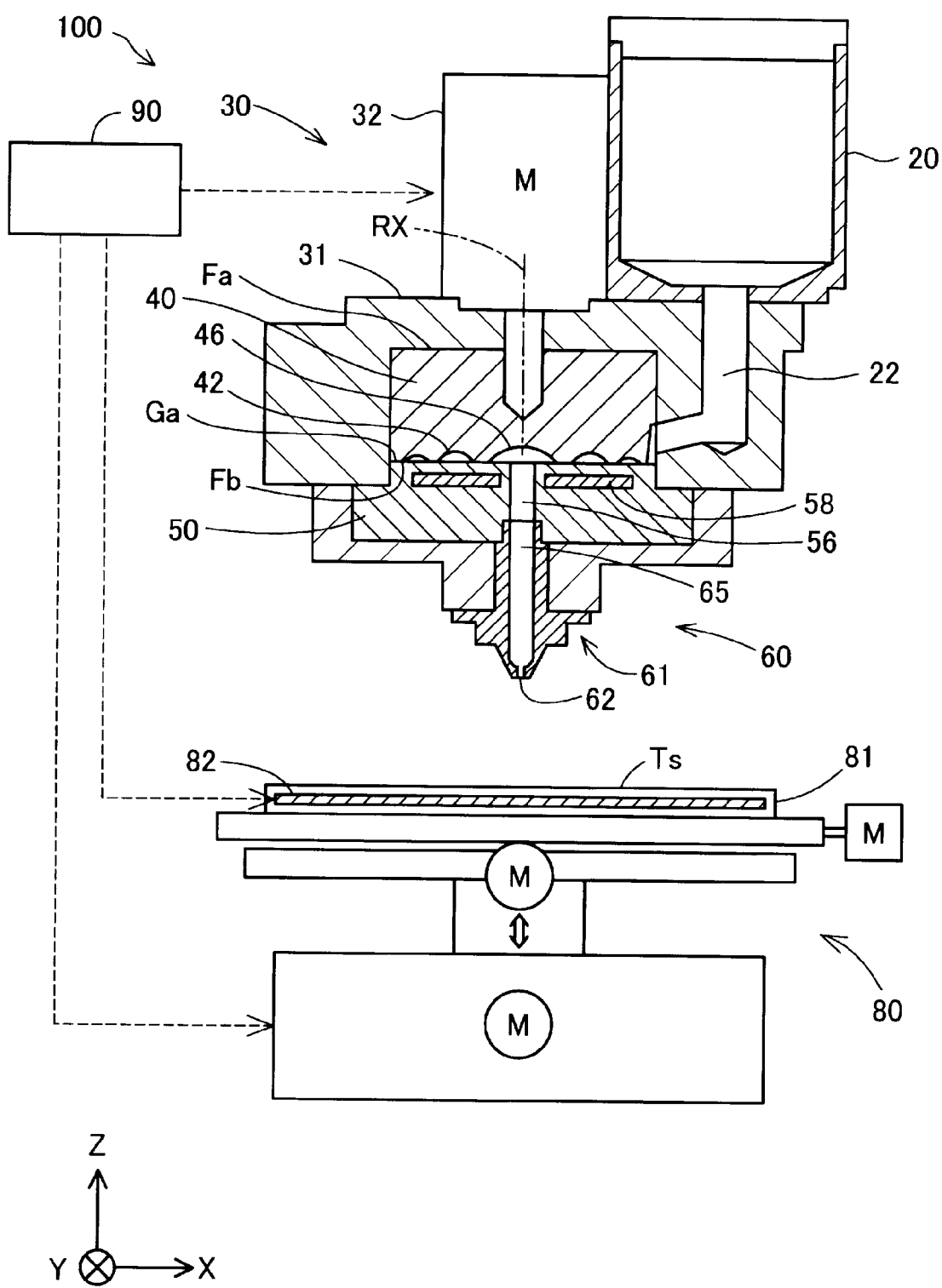
FIG. 2 is an explanatory diagram illustrating a schematic configuration illustrating a three-dimensional forming unit.

FIG. 2 is a schematic diagram illustrating the configuration of the forming unit 100 that forms a three-dimensional object in the first embodiment, in which some of the members are illustrated in cross-section. The forming unit 100 melts at least a part of a solid material to produce a paste-form forming material and disposes this forming material on the forming base 81. The forming unit 100 includes an ejecting portion 60, a material supply portion 20, and a forming material producing portion 30.

The material supply portion 20 supplies a material to the forming material producing portion 30. The material supply portion 20 is configured by, for example, a hopper that accommodates a material. The material supply portion 20 includes a discharge port on a lower side. This discharge port is connected to the forming material producing portion 30 through a communication path 22. The material is poured into the material supply portion 20 in the form of a pellet, powder, or the like. In the embodiment, an ABS resin material in the form of a pellet is used.

Figure 3:
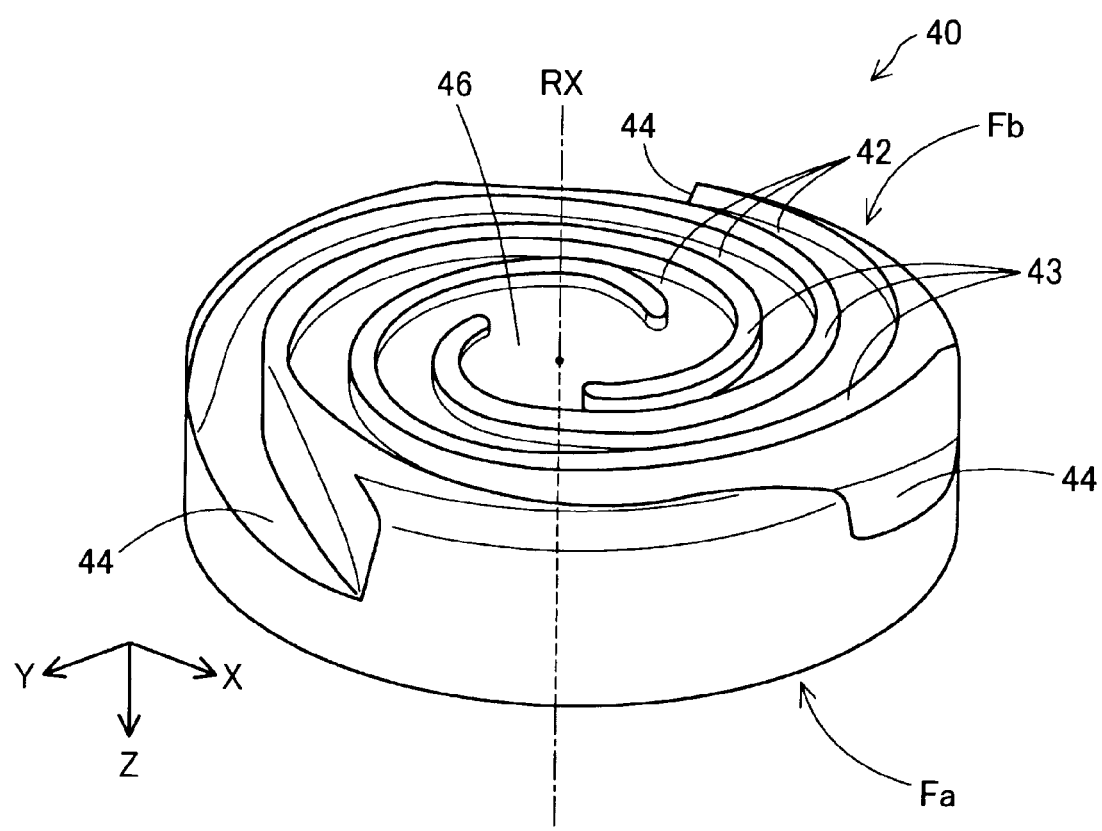
FIG. 3 is a schematic perspective view illustrating a configuration of a lower surface side of a flat screw.
Figure 4:
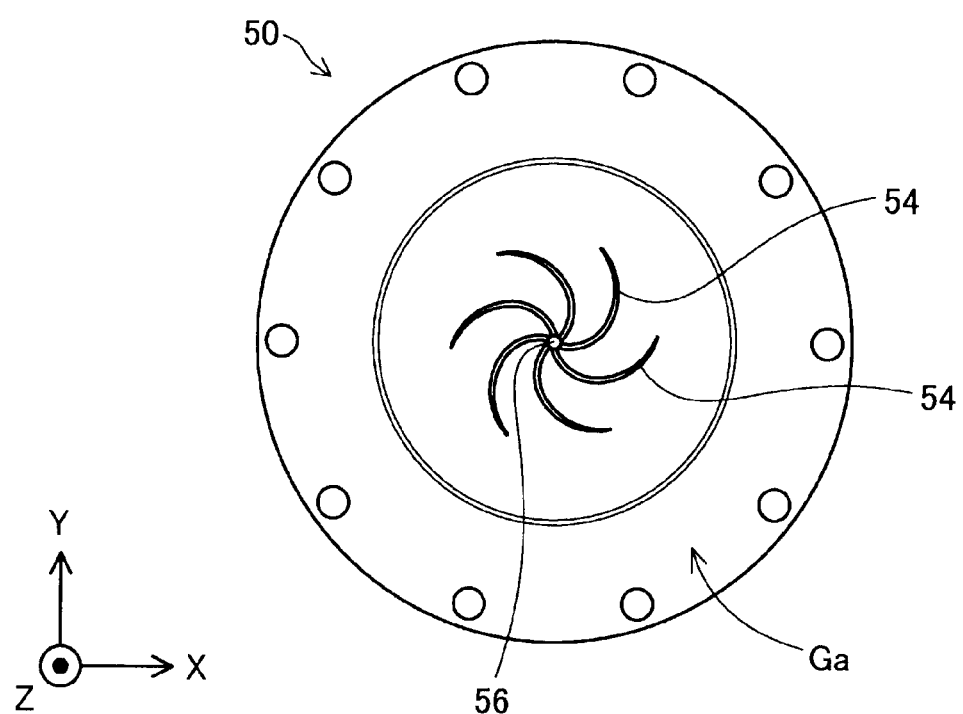
FIG. 4 is a schematic plan view illustrating an upper surface side of a screw-facing portion.

The forming material producing portion 30 melts at least a part of the material supplied from the material supply portion 20 to produce a paste-form forming material having fluidity and introduces the forming material into the ejecting portion 60. The forming material producing portion 30 includes a screw case 31, a driving motor 32, a flat screw 40, and a screw-facing portion 50. Specific configurations of the flat screw 40 and the screw-facing portion 50 are illustrated in FIGS. 3 and 4 described below, respectively.

The flat screw 40 has a substantially columnar shape with the height along a central axis thereof that is smaller than the diameter. The flat screw 40 is arranged such that the central axis thereof is parallel to the Z direction and rotates about the central axis. The central axis of the flat screw 40 conforms to a rotation axis RX thereof. In FIG. 2, the rotation axis RX of the flat screw 40 is illustrated by a one-dotted chain line.

The flat screw 40 is accommodated in the screw case 31. An upper surface Fa side of the flat screw 40 is connected to the driving motor 32, and the flat screw 40 rotates in the screw case 31 due to a rotation driving force generated by the driving motor 32. The driving motor 32 is driven under the control of the controller 90.

A groove portion 42 is formed on a lower surface Fb of the flat screw 40 that is a surface intersecting the rotation axis RX. The lower surface Fb of the flat screw 40 faces an upper surface Ga of a screw-facing portion 50, and a material is supplied from the material supply portion 20 into the groove portion 42 provided in the lower surface Fb of the flat screw 40. Specific configurations of the flat screw 40 and the groove portion 42 will be described later with reference to FIG. 3.

In the screw-facing portion 50, a heater 58 for heating the material is embedded. The material supplied into the groove portion 42 of the rotating flat screw 40 flows along the groove portion 42 while at least a part thereof is being melted due to the rotation of the flat screw 40, and is introduced in to a center portion 46 of the flat screw 40. The paste-form material flowing into the center portion 46 is supplied to the ejecting portion 60 as the forming material through a communication hole 56 provided at the center of the screw-facing portion 50.

The ejecting portion 60 includes a nozzle 61 and a flow path 65. The nozzle 61 is connected to the communication hole 56 of the screw-facing portion 50 through the flow path 65. The flow path 65 is a flow path of the forming material between the flat screw 40 and the nozzle 61. The nozzle 61 ejects the forming material produced in the forming material producing portion 30 to the forming base 81 from an opening portion 62 of a tip thereof. The details of the nozzle 61 according to the embodiment will be described below.

The moving mechanism 80 causes the relative positions of the forming base 81 and the nozzle 61 to change as described above. The forming base 81 is disposed at a position at which the forming base 81 faces the opening portion 62 of the nozzle 61. The forming base 81 has a forming surface Ts that serves as an upper surface in the vertical direction in a case in which the forming base 81 is arranged in the horizontal direction. In the embodiment, the moving mechanism 80 causes the forming base 81 to move relative to the nozzle 61 using driving force of three motors M. A temperature adjustment heater 82 that adjusts the temperature of the forming surface Ts under control provided by the controller 90 is incorporated in the forming base 81 according to the embodiment.

In the forming unit 100, a configuration in which the moving mechanism 80 causes the nozzle 61 to move relative to the forming base 81 in a state in which the position of the forming base 81 is fixed may be employed instead of the configuration in which the forming base 81 is caused to move by the moving mechanism 80. With such a configuration, it is still possible to change the relative positional relationship between the nozzle 61 and the forming base 81. In the following description, "the moving distance of the nozzle 61" means the distance by which the nozzle 61 moves relative to the forming base 81.

FIG. 3 is a schematic perspective view illustrating a configuration of the lower surface Fb side of the flat screw 40. For easy understanding of the technique, FIG. 3 illustrates the flat screw 40 in a state where a positional relationship between the upper surface Fa and the lower surface Fb illustrated in FIG. 2 is inverted in the vertical direction. In FIG. 3, the position of the rotation axis RX of the flat screw 40 during the rotation in the forming material producing portion 30 is indicated by a chain line. As described above with reference to FIG. 2, the groove portion 42 is provided on the lower surface Fb of the flat screw 40 facing the screw-facing portion 50. Hereinafter, the lower surface Fb will also be referred to as "groove-formed surface Fb".

The center portion 46 of the groove-formed surface Fb of the flat screw 40 is configured as a concavity to which one end of the groove portion 42 is connected. The center portion 46 faces the communication hole 56 of the screw-facing portion 50 illustrated in FIG. 2. In the embodiment, the center portion 46 intersects with the rotation axis RX.

The groove portion 42 of the flat screw 40 configures a so-called screw groove. The groove portion 42 extends in a spiral shape from the center portion 46 to an outer circumference of the flat screw 40 to form an arc. The groove portion 42 may be configured to extend in an involute curve shape or a helical shape. On the groove-formed surface Fb, a mountain-like portion 43 that configures a side wall portion of the groove portion 42 and extends along each groove portion 42 is provided.

The groove portion 42 continuously extends up to a material inlet port 44 that is formed on the side surface of the flat screw 40. The material inlet port 44 is a portion that receives the material supplied through the communication path 22 of the material supply portion 20.

When the flat screw 40 rotates, at least a part of the material supplied from the material inlet port 44 is heated and melted by the heater 58 described below in the groove portion 42 such that the fluidity of the material increases. The material flows to the center portion 46 through the groove portion 42, accumulates in the center portion 46, and is pressed out to the communication hole 56 of the screw-facing portion 50 due to an internal pressure generated in the center portion.

As illustrated in FIG. 3, the flat screw 40 includes three groove portions 42, three mountain-like portions 43, and three material inlet ports 44. The numbers of the groove portions 42, the mountain-like portions 43, and the material inlet ports 44 provided in the flat screw 40 are not limited to three. In the flat screw 40, only one groove portion 42 may be provided, and two or more groove portions 42 may be provided. In addition, the mountain-like portions 43 and the material inlet ports 44 corresponding to the number of the groove portions 42 may be provided.

FIG. 4 is a schematic plan view illustrating the upper surface Ga side of the screw-facing portion 50. As described above, the upper surface Ga of the screw-facing portion 50 faces the groove-formed surface Fb of the flat screw 40. Hereinafter, the upper surface Ga will also be referred to as "screw-facing surface Ga".

On the screw-facing surface Ga, plural guide grooves 54 are formed. The guide groove 54 is connected to the communication hole 56 formed at the center of the screw-facing surface Ga and extends in a spiral shape from the communication hole 56 to an outer circumference thereof. The guide grooves 54 function to guide the forming material to the communication hole 56. As described above with reference to FIG. 2, in the screw-facing portion 50, the heater 58 for heating the material is embedded. The melting of the material in the forming material producing portion 30 is realized by the heating by the heater 58 and the rotation of the flat screw 40. The molten material is pressed out to the flow path 65 of the ejecting portion 60 through the communication hole 56 of the screw-facing portion 50 and then is guided to the nozzle 61. The material guided to the nozzle 61 is finally ejected from the opening portion 62.

In the forming unit 100, by using the flat screw 40 having a small size in the Z direction, an occupancy range in the Z direction of a route for melting at least a part of the material and introducing the molten material to the nozzle 61 is reduced as illustrated in FIG. 2. This way, in the forming unit 100, by using the flat screw 40, the size of the mechanism of forming the forming material is reduced. In addition, by using the flat screw 40, the accuracy of the ejection control of the forming material from the nozzle 61 is improved, and the object can be easily and effectively formed through a first forming process and a second forming process, which will be described later.

In the forming unit 100, by using the flat screw 40, the configuration of supplying the forming material that is treated to have fluidity to the nozzle 61 is easily realized. In this configuration, the amount of the forming material ejected from the opening portion 62 of the nozzle 61 can be controlled by controlling the rotation speed of the flat screw 40, and the ejection control of the forming material from the opening portion 62 is simplified. "The amount of the forming material ejected from the opening portion 62" refers to the flow rate of the forming material flowing out from the opening portion 62 of the nozzle 61.

Figure 5:
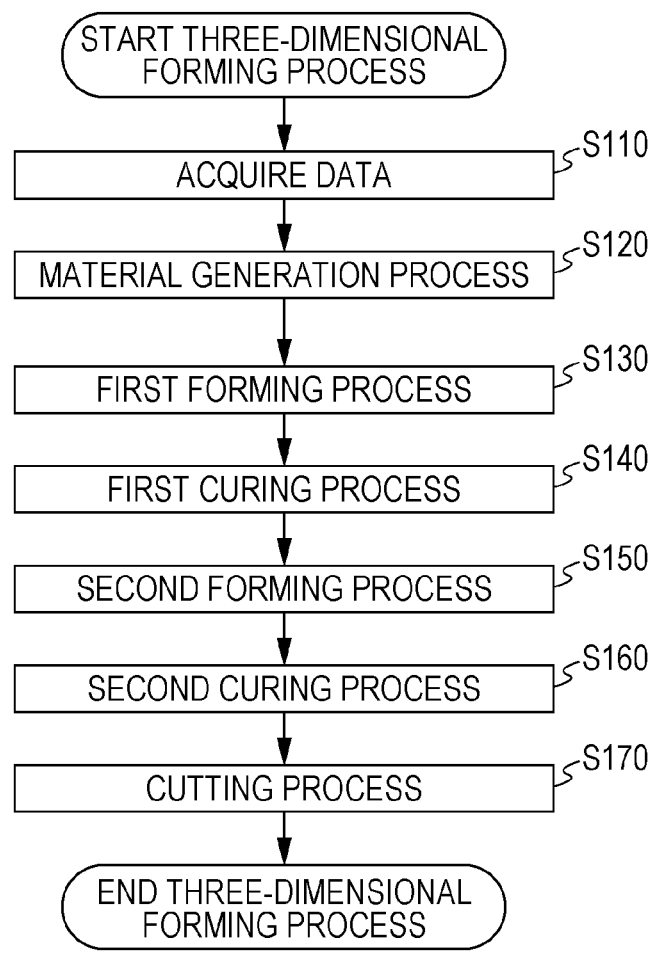
FIG. 5 is a flowchart illustrating details of a three-dimensional forming process according to a first embodiment.

FIG. 5 is a flowchart illustrating details of a three-dimensional forming process according to the embodiment. First, in Step S110, the controller 90 acquires tool pass data for realizing the first forming process to the cutting process from a computer or a recording medium that is connected to the three-dimensional forming apparatus 10. The tool pass data is data representing a scanning trajectory of the moving mechanism 80 that causes the forming unit 100, the cutting unit 99, and the forming base 81 to move when the three-dimensional object OB is formed. Shape data of the three-dimensional object OB represented in the STL format or the AMF format is converted into the tool pass data via a slicer. Next, in Step S120, the controller 90 performs a material generation process of controlling rotation of the flat screw 40, causing at least a part of the material to be melted, and starting generation of the forming material. Note that the forming material may be continuously generated when the first forming process and the second forming process, which will be described later, are performed. Thereafter, the first forming process, the first curing process, the second forming process, and the second curing process are performed in this order in Steps S130 to S160. Details of the first forming process, the first curing process, the second forming process, and the second curing process will be described later with reference to FIGS. 6 to 9. In the embodiment, the temperature of the forming surface Ts is adjusted to a temperature that does not exceed a glass transition point of the forming material with the temperature adjustment heater 82 incorporated in the forming base 81 before the first forming process is performed. By the temperature of the forming surface Ts being adjusted, adhesiveness of the three-dimensional object OB formed through the three-dimensional forming process and the forming surface Ts is improved. It is not essential to adjust the temperature of the forming surface Ts. In Step S170, the controller 90 performs a cutting process of controlling the cutting unit 99 and cutting at least a part of the three-dimensional object OB by executing cutting control. Through the cutting process, it is possible to perform surface finishing or the like on the three-dimensional object OB.

Figure 6:
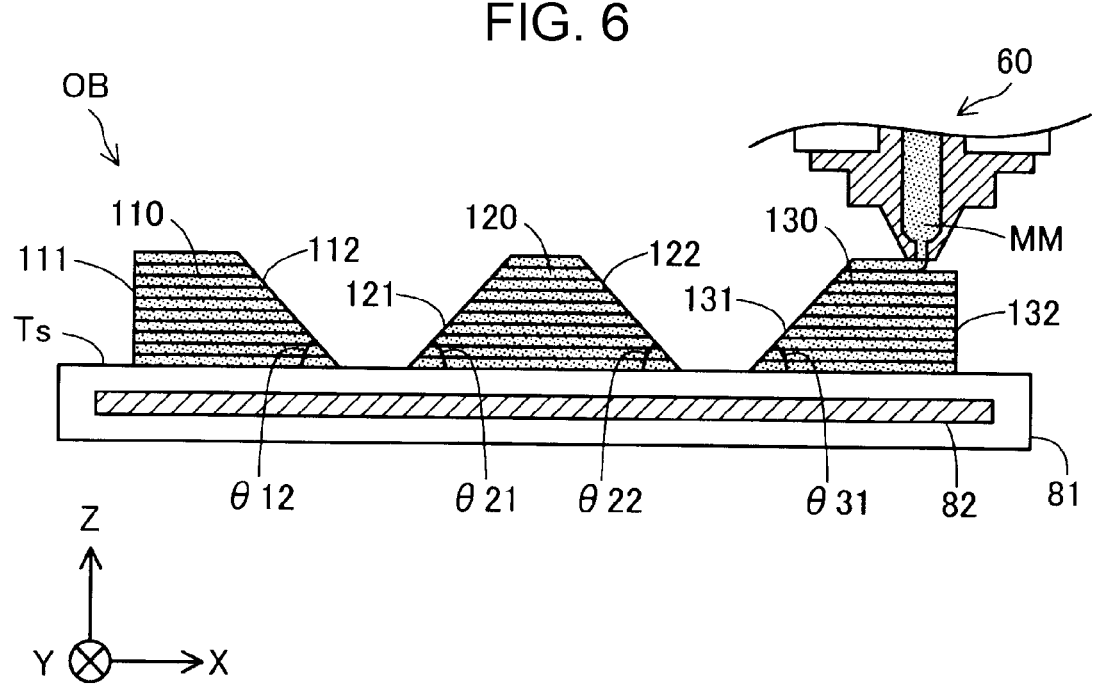
FIG. 6 is a process diagram illustrating a first forming process according to the first embodiment.

FIG. 6 is a process diagram illustrating a first forming process according to the embodiment. In the first forming process, the controller 90 forms a first segment 110, a second segment 120, and a third segment 130 in which the forming material is laminated on the forming surface Ts by causing the nozzle 61 to eject the melted forming material toward the forming surface Ts while changing the relative positions of the nozzle 61 and the forming surface Ts through execution of first forming control. The first segment 110, the second segment 120, and the third segment 130 are respectively formed such that the first segment 110, the second segment 120, and the third segment 130 are separated from each other in a first direction in parallel to the forming surface Ts. By a multilayered forming material being laminated toward the upper side in the second direction that is perpendicular to the forming surface Ts, the first segment 110, the second segment 120, and the third segment 130 are formed. The first direction is the X direction, and the second direction is the Z direction in the embodiment. The upper side in the second direction means a direction away from the forming surface Ts. The upper side in the second direction is a +Z direction in the embodiment. In the embodiment, the first segment 110 is first formed by the forming material being laminated in ten layers. Next, the second segment 120 is formed by the forming material being laminated in ten layers at a position away from the first segment 110 in the +X direction. Thereafter, the third segment 130 is formed by the forming material being laminated in ten years at a position away from the second segment 120 in the +X direction. In the embodiment, the first segment 110, the second segment 120, and the third segment 130 are formed such that each of the cut surfaces of the first segment 110, the second segment 120, and the third segment 130 cut along a surface in parallel to the X direction and the Z direction has a trapezoidal shape with a bottom side on the side of the bottom surface that is longer than an upper side on the side of the upper surface. The "bottom surface" of each of the segments 110, 120, and 130 means a surface on the side of the forming surface Ts. The "upper surface" of each of the segments 110, 120, and 130 means a surface that is away from the bottom surface in the second direction and that is on the side opposite to the bottom surface. The "trapezoidal shape" means a complete trapezoidal shape including a substantially trapezoidal shape. The "substantially trapezoidal shape" includes a shape in which a part of a trapezoidal shape is curved and a shape in which a part of a trapezoidal shape has irregularity and a step difference, for example. In the embodiment, the first segment 110, the second segment 120, and the third segment 130 are formed such that the widths thereof in the Y direction become the same.

In the embodiment, the first segment 110 has a first left side surface that is an end surface on the side in the −X direction and a first right side surface 112 that is an end surface on the side in the +X direction. The second segment 120 has a second left side surface 121 that is an end surface on the side in the −X direction and a second right side surface 122 that is an end surface on the side in the +X direction. The third segment 130 has a third left side surface 131 that is an end surface on the side in the −X direction and a third right side surface 132 that is an end surface on the side in the +X direction. The first left side surface 111 and the third right side surface 132 are formed such that the first left side surface 111 and the third right side surface are perpendicular to the forming surface Ts. The first right side surface 112 is inclined such that the first right side surface 112 is further separated from the second segment 120 away from the forming surface Ts in the Z direction and the first right side surface forms an inclination angle θ12 relative to the forming surface Ts. The second left side surface 121 is inclined such that the second left side surface 121 is further separated from the first segment 110 away from the forming surface Ts in the Z direction and the second left side surface 121 forms an inclination angle θ21 relative to the forming surface Ts. The second right side surface 122 is inclined such that the second right side surface 122 further separated from the third segment 130 away from the forming surface Ts in the Z direction and the second right side surface 122 forms an inclination angle θ22 relative to the forming surface Ts. The third left side surface 131 is inclined such that the third left side surface 131 is further separated from the second segment 120 away from the forming surface Ts in the Z direction and the third left side surface 131 forms an inclination angle θ31 relative to the forming surface Ts. The respective inclination angles θ12, θ21, θ22, and θ31 are preferably set such that the inclined respective side surfaces 112, 121, 122, and 131 do not interfere with the nozzle 61 in the later process. The respective inclination angles θ12, θ21, θ22, and θ31 are set to be equal to or less than 60°, for example.

Figure 7:
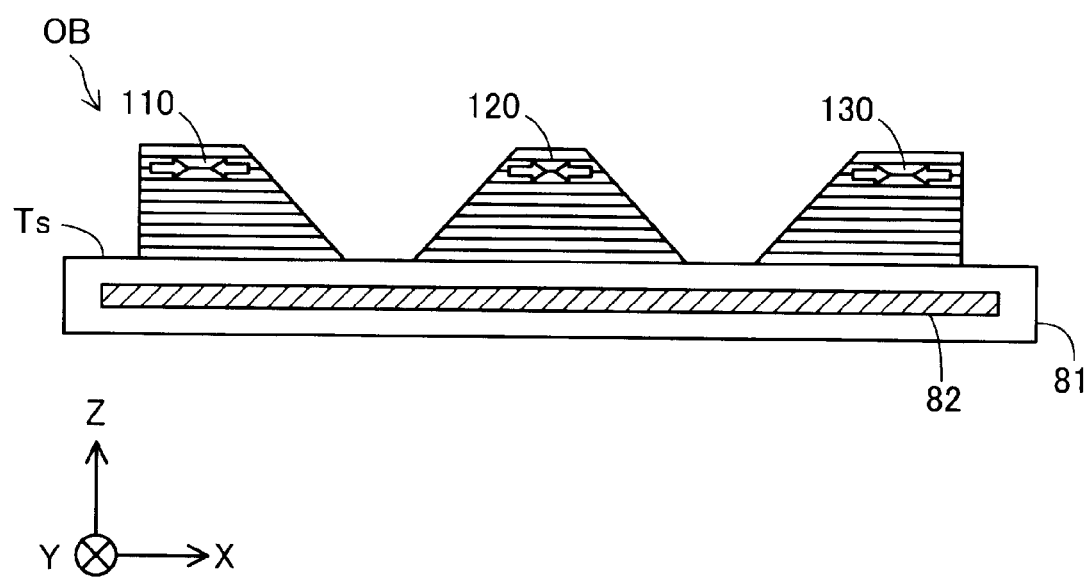
FIG. 7 is a process diagram illustrating a first curing process according to the first embodiment.

FIG. 7 is a process diagram illustrating the first curing process according to the embodiment. In the first curing process, the controller 90 cures the first segment 110, the second segment 120, and the third segment 130 by executing the first curing control. In the embodiment, since the thermoplastic ABS resin is used as the forming material, the first segment 110, the second segment 120, and the third segment 130 are cured by cooling the laminated forming material. In the embodiment, the controller 90 cools and cures the laminated forming material by leaving the laminated forming material in a predetermined period. Note that the three-dimensional forming apparatus 10 may be provided with a blower and may cool the laminated forming material by blowing wind from the blower.

Figure 8:
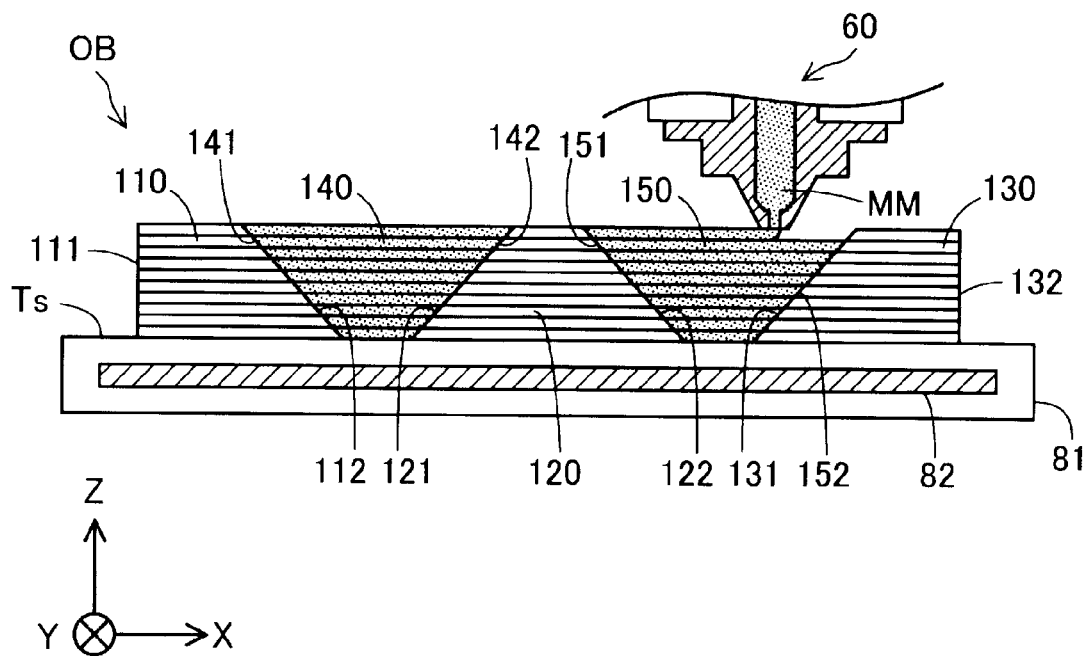
FIG. 8 is a process diagram illustrating a second forming process according to the first embodiment.

FIG. 8 is a process diagram illustrating a second forming process according to the embodiment. In the second forming process, the controller 90 forms a fourth segment 140 in which the forming material is laminated between the first segment 110 and the second segment 120 by ejecting the melted forming material from the nozzle 61 toward the forming surface Ts while changing the relative positions of the nozzle 61 and the forming surface Ts through execution of second forming control. The controller 90 forms a fifth segment 150 in which the forming material is laminated between the second segment 120 and the third segment 130 similarly to the fourth segment 140. The fourth segment 140 has a shape that successively connects the first right side surface 112 that is an end surface of the first segment 110 on the side of the second segment 120 to the second left side surface 121 that is an end surface of the second segment 120 on the side of the first segment 110. The fifth segment 150 has a shape that successively connects the second right side surface 122 that is an end surface of the second segment 120 on the side of the third segment 130 to the third left side surface 131 that is an end surface of the third segment 130 on the side of the second segment 120. "Successively connecting" means that two portions are connected with the same width and the same height in a case in which the respective separate portions of the three-dimensional object have the same width and the same height. Also, in a case in which the two separate portions of the three-dimensional object have different widths and different heights, "successively connecting" means connecting the respective portions such that the heights or the widths gradually increase or decrease. In the embodiment, the forming material is laminated in ten layers and the fourth segment 140 is thus formed between the first segment 110 and the second segment 120, and the first segment 110 and the second segment 120 are connected to each other with the fourth segment 140. Thereafter, the forming material is laminated in ten layers and the fifth segment 150 is thus formed between the second segment 120 and the third segment 130, and the second segment 120 and the third segment 130 are connected to each other with the fifth segment 150. In the embodiment, the fourth segment 140 and the fifth segment 150 are formed such that each of cut surfaces of the fourth segment 140 and the fifth segment 150 cut along surfaces in parallel to the X direction and the Z direction has a trapezoidal shape with a bottom side on the side of the bottom surface that is shorter than an upper side on the side of the upper surface. The "bottom surface" of each of the segments 140 and 150 means a surface on the side of the forming surface Ts. The "upper surface" of each of the segments 140 and 150 means a surface that is on the side opposite to the bottom surface. In the embodiment, the fourth segment 140 and the fifth segment 150 are formed such that the widths thereof in the Y direction become the same as those of the first segment 110, the second segment 120, and the third segment 130.

In the embodiment, the fourth segment 140 has a fourth left side surface 141 that is an end surface on the side in the −X direction and a fourth right side surface 142 that is an end surface on the side in the +X direction. The fifth segment 150 has a fifth left side surface 151 that is an end surface on the side in the −X direction and a fifth right side surface 152 that is an end surface on the side in the +X direction. The fourth segment 140 is formed such that the fourth left side surface 141 is in contact with the first right side surface 112 and the fourth right side surface 142 is in contact with the second left side surface 121. The fifth segment 150 is formed such that the fifth left side surface 151 is in contact with the second right side surface 122 and the fifth right side surface 152 is in contact with the third left side surface 131.

Figure 9:
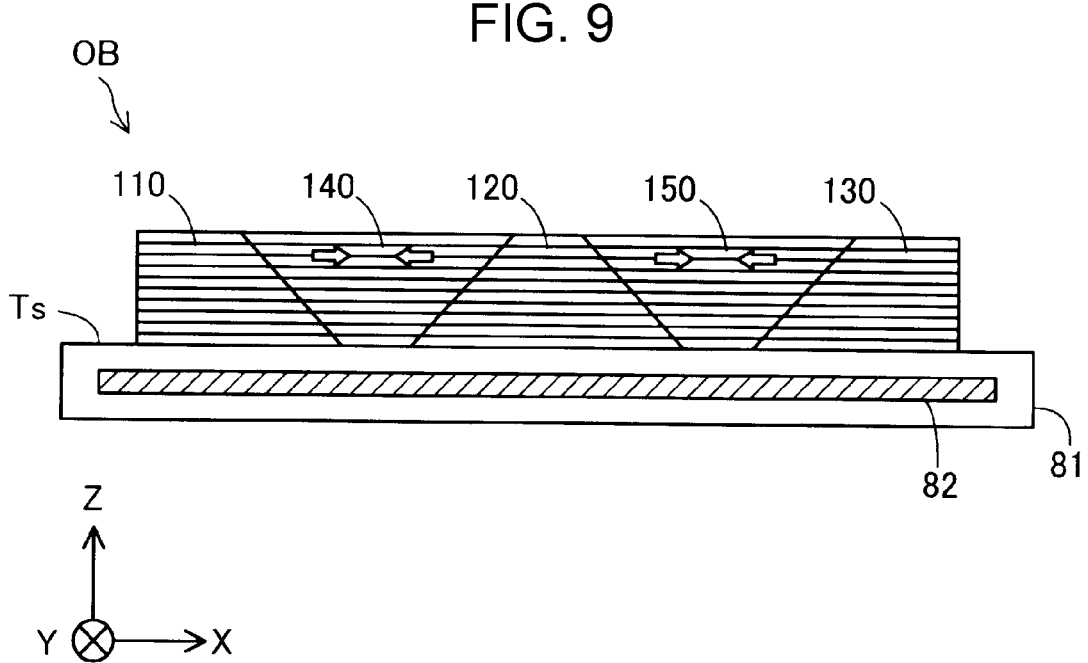
FIG. 9 is a process diagram illustrating a second curing process according to the first embodiment.

FIG. 9 is a process diagram illustrating the second curing process according to the embodiment. In the second curing process, the controller 90 cures the fourth segment 140 and the fifth segment 150 similarly to the first curing process by executing the second curing control. The three-dimensional object OB is formed in the first forming process through the second curing process. Note that in the specification, the first segment 110 will be referred to as the first portion, the second segment formed away from the first segment 110 in the first direction will be referred to as the second segment 120, and the fourth segment 140 formed between the first segment 110 and the second segment 120 will be referred to as the third portion in some cases. Also, the second segment 120 will be referred to as the first portion, the third segment 130 formed away from the second segment 120 in the first direction will be referred to as the second portion, and the fifth segment 150 formed between the second segment 120 and the third segment 130 will be referred to as the third portion in some cases.

Since the three-dimensional object OB is formed by the forming material ejected from the nozzle 61 being laminated from the bottom surface side toward the upper surface side, the forming material on the bottom surface side that is ejected from the nozzle 61 earlier is cooled and cured earlier than the forming material on the upper surface side that is ejected from the nozzle 61 later. The forming material contracts during the curing. Since the forming material on the bottom surface side that has been cured earlier is pulled when the forming material on the upper surface side that is cured layer contracts, warpage occurs in the three-dimensional object OB. The amount of contraction increases and the force by which the forming material on the bottom surface side is pulled by the forming material on the upper surface side increases as the length of the forming material cured at once increases. Therefore, warpage occurring in the three-dimensional object OB increases as the length of the forming material cured at once increases. In the embodiment, the first segment 110 to the third segment 130 are first formed in a separate manner in the first forming process as illustrated in FIG. 6, and the first segment 110 to the third segment 130 are cured in the first curing process illustrated in FIG. 7, among the first segment 110 to the fifth segment 150 that form the three-dimensional object OB. At this time, small force that may cause warpage acts on each of the first segment 110 to the third segment 130 as represented by the arrows in FIG. 7. Small warpage occurs in each of the first segment 110 to the third segment 130 due to this small force. Thereafter, the fourth segment 140 and the fifth segment 150 are formed such that the remaining portions of the three-dimensional object OB are filled in the second forming process as illustrated in FIG. 8, and the fourth segment 140 and the fifth segment 150 are cured in the second curing process as illustrated in FIG. 9. At this time, small force that may cause warpage works on each of the fourth segment 140 and the fifth segment 150 as represented by the arrows in FIG. 9. Small warpage occurs in each of the fourth segment 140 and the fifth segment 150 due to this small force. That is, since the force that may work on the entire three-dimensional object OB and that may cause warpage in a case in which the three-dimensional object OB is once formed and cured is dispersed to each of the first segment 110 to the fifth segment 150, warpage occurring in the entire three-dimensional object OB is small.

Figure 10:
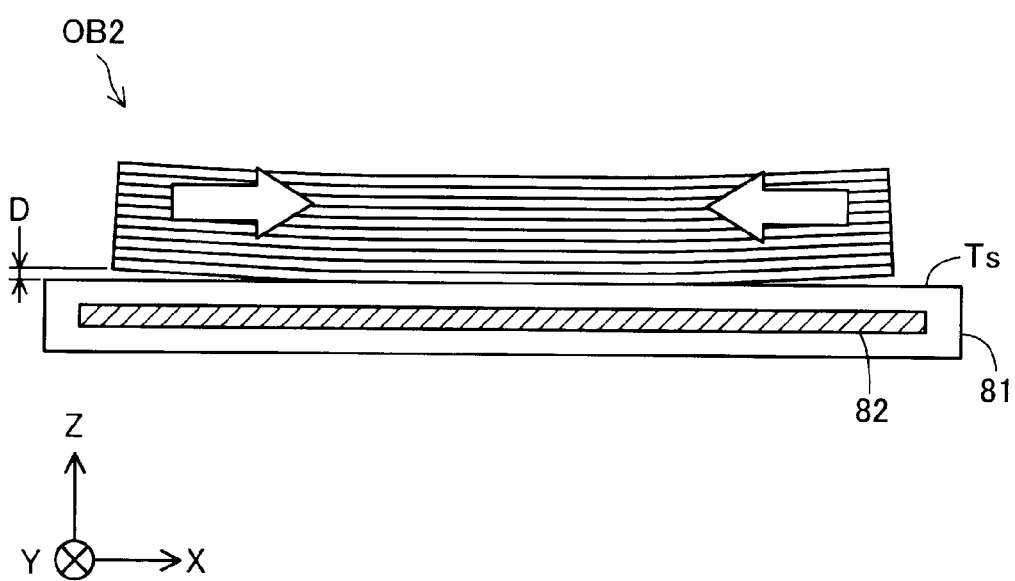
FIG. 10 is an explanatory diagram illustrating a state of warpage of a three-dimensional object according to a comparative example.

FIG. 10 is an explanatory diagram illustrating a state of warpage in a three-dimensional object OB2 according to a comparative example. The three-dimensional object OB2 in the comparative example has a dimension that is the same as that of the three-dimensional object OB in the first embodiment. The three-dimensional object OB2 according to the comparative example is formed and cured as a whole at the same time without being divided into the first segment 110 to the fifth segment 150 unlike the three-dimensional object OB in the first embodiment. The forming material on the bottom surface side that has been cured earlier is strongly pulled due to contraction of the forming material on the upper surface side that is cured later, strong force that may cause warpage acts, and warpage thus occurs in the three-dimensional object OB2 as represented by the arrow in FIG. 10 when the three-dimensional object OB2 is cured. Therefore, the amount D of warpage of the entire three-dimensional object OB2 is larger in the comparative example than in the first embodiment.

According to the method of forming the three-dimensional object OB of the embodiment as described above, the controller 90 forms the first segment 110, the second segment 120, and the third segment 130 such that the first segment 110, the second segment 120, and the third segment 130 are separated from each other in the X direction in the first forming process, and the respective segments 110, 120, and 130 formed in a separate manner are cured in the first curing process. Thereafter, the controller 90 forms the fourth segment 140 and the fifth segment 150 such that the respective segments 110, 120, and 130 formed in a separate manner are connected to each other in the second forming process, and the controller 90 cures the fourth segment 140 and the fifth segment 150, thereby creating the three-dimensional object OB in the second curing process. Therefore, it is possible to further inhibit warpage in the three-dimensional object OB as compared with the case in which the three-dimensional object OB including the respective segments 110, 120, 130, 140, and 150 is formed and cured at once.

Also, in the embodiment, the respective segments 110, 120, and 130 are formed such that end surfaces of the respective end surfaces that the first segment 110, the second segment 120, and the third segment 130 formed in the first forming process have that are in contact with the fourth segment 140 and the fifth segment 150 formed in the second forming process are inclined to form acute angles relative to the forming surface Ts. Therefore, it is possible to inhibit interference of the nozzle 61 with the respective segments 110, 120, and 130 formed in the first forming process when the respective segments 140 and 150 are formed in the second forming process. In particular, since the respective segments 110, 120, and 130 formed in the first forming process are formed into trapezoidal shapes, it is possible to more reliably secure the intervals of the respective segments 110, 120, and 130 in the embodiment. Therefore, it is possible to further inhibit interference of the nozzle 61 with the respective segments 110, 120, and 130 in the second forming process.

Also, the three-dimensional object OB is processed using the cutting unit 99 in the cutting process in the embodiment. Therefore, it is possible to create the three-dimensional object with high dimensional precision.

In the embodiment, a transfer process of melting the material into the forming material with the flat screw 40 is provided. Therefore, the melted material is laminated using the forming unit 100 that has a small-sized flat screw 40. Therefore, it is possible to produce the three-dimensional object OB using the small-sized three-dimensional forming apparatus 10.

Note that although the ABS resin material in the pellet form is used in the embodiment, a material of forming a three-dimensional object that contains, as main materials, various materials such as a thermoplastic material, a metal material, and a ceramic material, for example, can also be employed as materials used by the forming unit 100. Here, the "main materials" means materials that mainly form the shape of the three-dimensional object and means materials that occupy the content of 50% by weight or more in the three-dimensional object. The aforementioned forming material include such materials melted alone and a material in a paste form in which a part of constituents contained along with the main materials is melted.

When the thermoplastic material is used as the main material, the forming material is produced by plasticizing the corresponding material in the forming material producing portion 30. "Plasticizing" refers to applying heat to the thermoplastic material to be melted.

As the thermoplastic material, for example, one kind or a combination of two or more kinds selected from the following thermoplastic resin materials can be used.

Examples of Thermoplastic Resin Material

A general engineering plastic such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, or polyethylene terephthalate; and an engineering plastic such as polysulfone, polyether sulfone, polyphenylene sulfide, polyarylate, polyimide, polyamide imide, polyether imide, or polyether ether ketone A pigment, a metal, a ceramic, or an additive such as a wax, a flame retardant, an antioxidant, or a heat stabilizer may be incorporated into the thermoplastic material. The thermoplastic material is plasticized and melted by the rotation of the flat screw 40 and the heating of the heater 58 in the forming material producing portion 30. In addition, the forming material produced as described above is ejected from the nozzle 61 and then is cured by a temperature decrease.

It is preferable that the thermoplastic material is ejected from the nozzle 61 in a state where the thermoplastic material is heated to a glass transition point thereof or higher and is completely melted. For example, the glass transition point of an ABS resin is about 120° C., and it is preferable that the temperature of the ABS resin is about 200° C. when ejected from the nozzle 61. In order to eject the forming material in a high-temperature state, a heater may be provided in the vicinity of the nozzle 61.

In the forming unit 100, for example, the following metal material may be used as the main material instead of the thermoplastic material. In this case, it is preferable that components melted during the production of the forming material are mixed with a powder material of the following metal materials and the mixture is poured into the forming material producing portion 30.

Example of Metal Material

One kind of metal or an alloy including one or more kinds selected from magnesium (Mg), iron (Fe), cobalt (Co), chromium (Cr), aluminum (Al), titanium (Ti), copper (Cu), and nickel (Ni)

Example of Alloy

Maraging steel, stainless steel, cobalt-chromium-molybdenum, titanium alloys, nickel alloys, aluminum alloys, cobalt alloys, and cobalt-chromium alloys In the forming unit 100, a ceramic material may be used as the main material instead of the metal material. As the ceramic material, for example, an oxide ceramic such as silicon dioxide, titanium dioxide, aluminum oxide, or zirconium oxide or a non-oxide ceramic such as aluminum nitride can be used. When the metal material or the ceramic material is used as the main material, the forming material disposed on the forming base 81 may be cured through sintering by laser irradiation, hot air blowing, or the like.

The powder material of the metal material or the ceramic material to be poured into the material supply portion 20 may be a mixed material obtained by mixing plural kinds of single metal powders or alloy powders, or ceramic material powders. In addition, the powder material of the metal material or the ceramic material may be coated with the above-described thermoplastic resins or other thermoplastic resins. In this case, in the forming material producing portion 30, this thermoplastic resin may be melted to exhibit fluidity.

For example, the following solvent can also be added to the powder material of the metal material or the ceramic material to be poured into the material supply portion 20. As the solvent, one kind or a combination of two or more kinds selected from the above examples can be used.

Examples of Solvent

Water; (poly)alkylene glycol monoalkyl ethers such as ethylene glycol monomethyl ether, ethylene glycol monoethyl ether, propylene glycol monomethyl ether, or propylene glycol monoethyl ether; acetates such as ethyl acetate, n-propyl acetate, isopropyl acetate, n-butyl acetate, or isobutyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetyl acetone; alcohols such as ethanol, propanol, or butanol; tetraalkylammonium acetates; sulfoxide solvents such as dimethyl sulfoxide or diethyl sulfoxide; pyridine solvents such as pyridine, γ-picoline, or 2,6-lutidine; tetraalkylammonium acetates (for example, tetrabutylammonium acetate); and ionic liquids such as butyl carbitol acetate In addition, the following binder can also be added to the powder material of the metal material or the ceramic material to be poured into the material supply portion 20.

Examples of Binder

Figure 11:
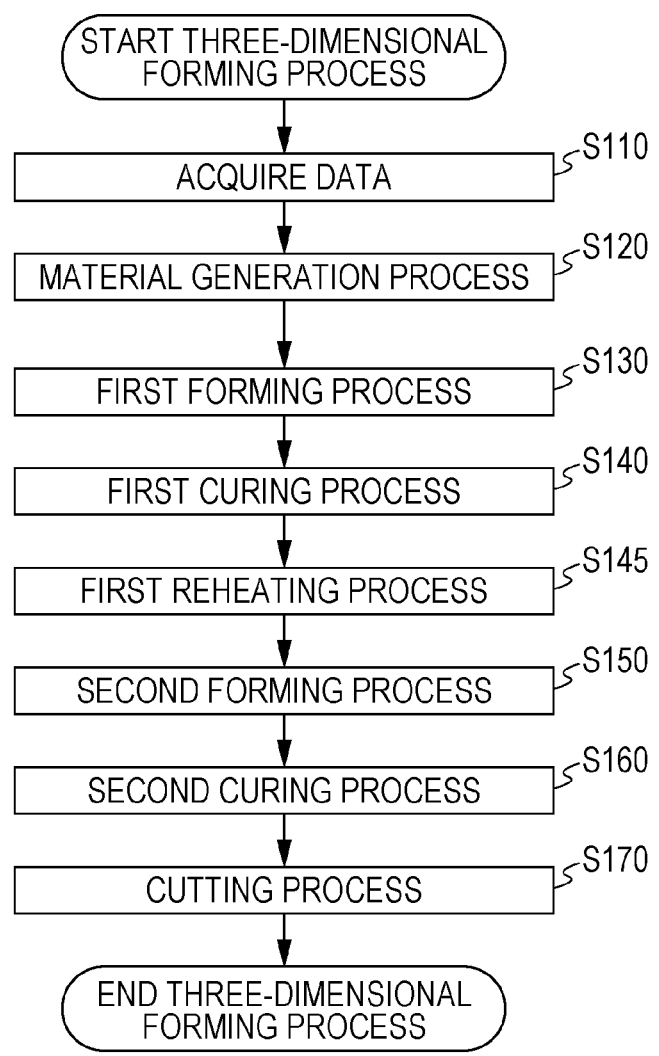
FIG. 11 is a flowchart illustrating details of a three-dimensional forming process according to a second embodiment.

An acrylic resin, an epoxy resin, a silicone resin, a cellulose resin, or other synthetic resins; and thermoplastic resins such as polylactic acid (PLA), polyamide (PA), polyphenylene sulfide (PPS), polyether ether ketone (PEEK), or other thermoplastic resins B. Second Embodiment FIG. 11 is a flowchart illustrating details of a three-dimensional forming process according to a second embodiment. The second embodiment is different from the first embodiment in that a first reheating process in Step S145 is provided between the first curing process in Step S140 and the second forming process in Step S150. Other steps are the same as those in the first embodiment.

Figure 12:
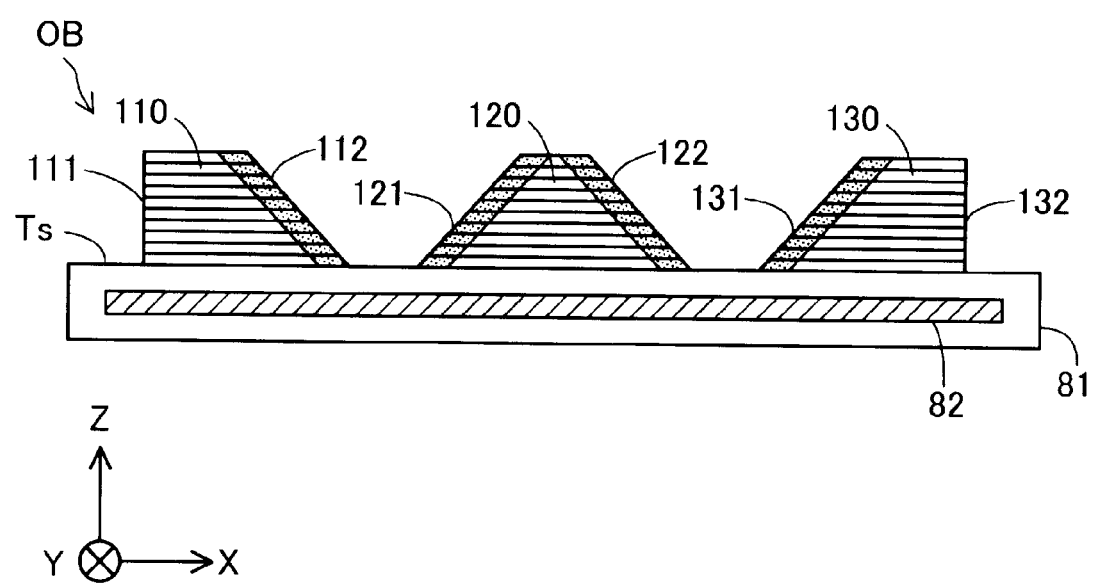
FIG. 12 is a process diagram illustrating a first reheating process according to the second embodiment.

FIG. 12 is a process diagram illustrating a first reheating process according to the second embodiment. In the first reheating process, the controller 90 heats, with a heater or the like, the first right side surface 112, the second left side surface 121, the second right side surface 122, and the third left side surface 131 that are end surfaces in contact with the fourth segment 140 or the fifth segment 150 and melt at least a part of the forming material again in the second forming process as illustrated in FIG. 8, among the respective end surfaces of the first segment 110, the second segment 120, and the third segment 130 in the X direction that have been cured in the first curing process, through execution of first reheating control. Thereafter, the controller 90 performs the second forming process in a state in which the forming material at the aforementioned respective side surfaces 112, 121, 122, and 131 are melted.

According to the method of forming a three-dimensional object OB of the embodiment, it is possible to improve adhesiveness of the fourth segment 140 relative to the first segment 110 and the second segment 120 and adhesiveness of the fifth segment 150 relative to the second segment 120 and the third segment 130.

C. Third Embodiment

Figure 13:
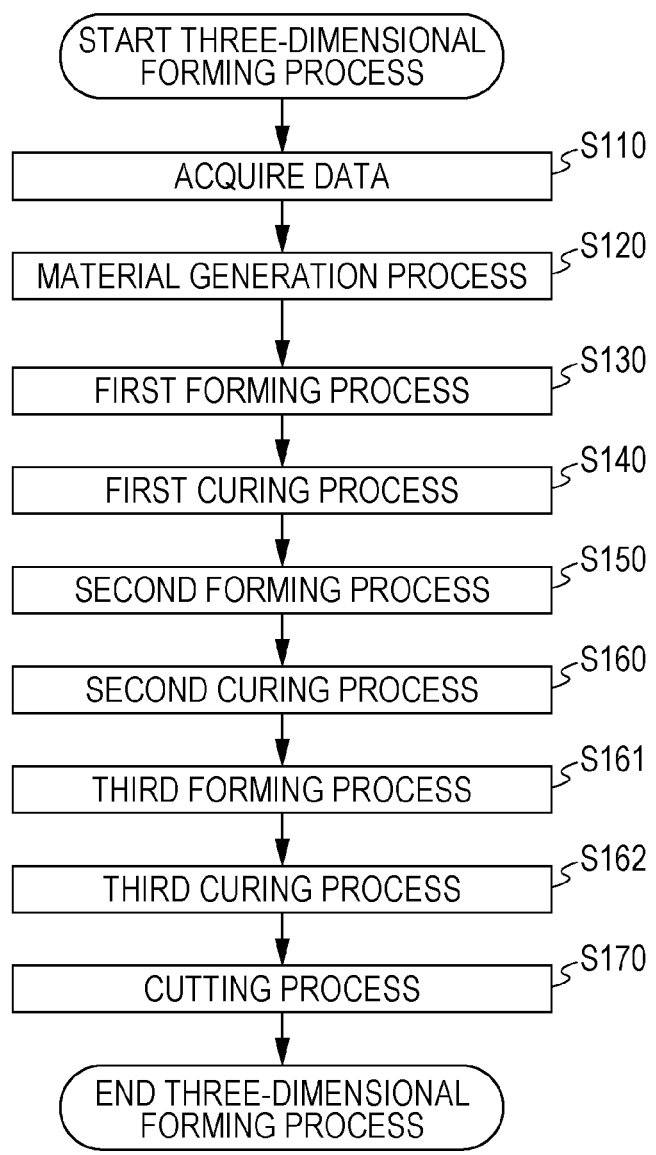
FIG. 13 is a flowchart illustrating details of a three-dimensional forming process according to a third embodiment.

FIG. 13 is a flowchart illustrating details of a three-dimensional forming process according to a third embodiment. The third embodiment is different from the first embodiment other than forms of a fourth segment 140B and a fifth segment 150B that are formed in the second forming process in Step S150. Also, the third embodiment is different from the first embodiment in that a third forming process in Step S161 and a third curing process in Step S162 are provided after the second curing process in Step S160. The other steps are the same as those in the first embodiment.

Figure 14:
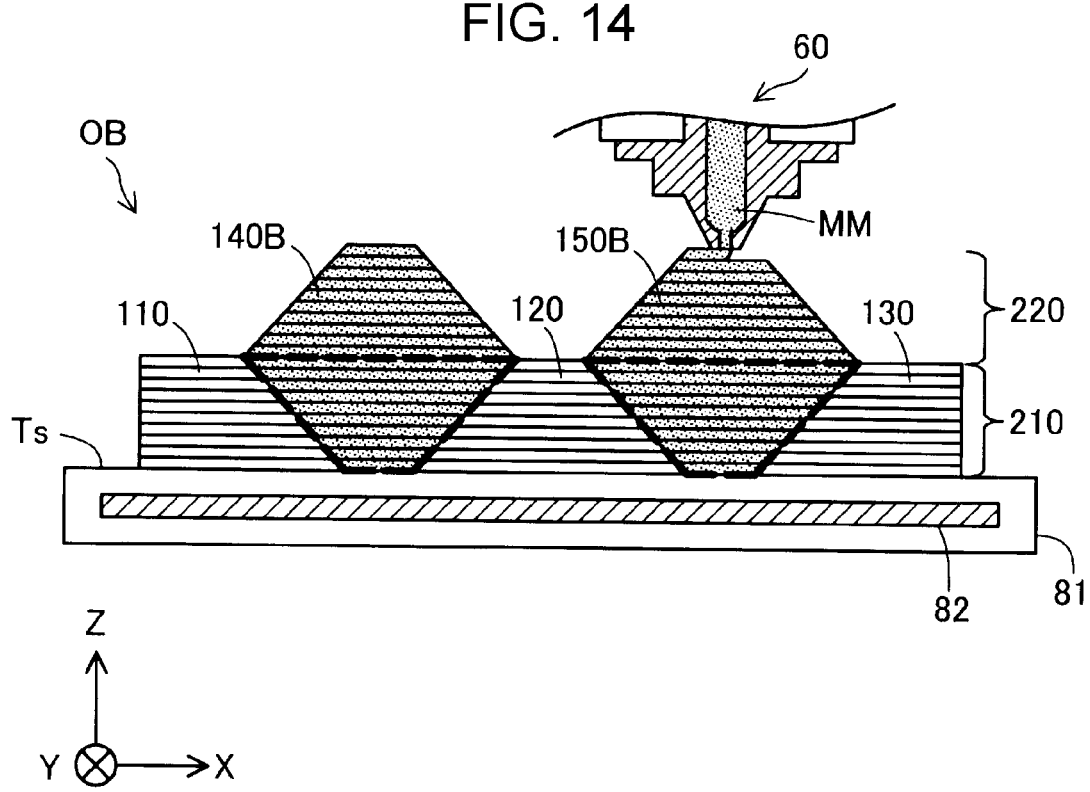
FIG. 14 is a process diagram illustrating a second forming process according to the third embodiment.

FIG. 14 is a process diagram illustrating a second forming process for creating a lower layer 210 of a three-dimensional object OB according to the third embodiment. The three-dimensional object OB in the embodiment includes the lower layer 210 formed on the forming surface Ts and an upper layer 220 formed on the lower layer 210. A fourth segment 140B formed in the second forming process according to the embodiment has a form in which the fourth segment 140 according to the first embodiment is further laminated on the fourth segment 140 according to the first embodiment in a vertically symmetrical manner. A fifth segment 150B formed in the second forming process according to the embodiment has a form in which the fifth segment 150B according to the first embodiment is further laminated on the fifth segment 150 according to the first embodiment in a vertically symmetrical manner. That is, the fourth segment 140 and the fifth segment 150 are formed such that each of the cut surfaces of the fourth segment 140B and the fifth segment 150B cut along surfaces in parallel to the X direction and the Z direction has a hexagonal shape in the second forming process according to the embodiment. The "hexagonal shape" has a meaning including a substantially hexagonal shape as well as a complete hexagonal shape. The "substantially hexagonal shape" includes a shape in which a part of a hexagonal shape is bent and a shape in which a part of a hexagonal shape has irregularity and unevenness. In FIG. 14, the shape of the fourth segment 140B that successively connects the end surface of the first segment 110 on the side of the second segment 120 to the end surface of the second segment 120 on the side of the first segment 110 is represented by a broken line. Also, the shape of the fifth segment 150B that successively connects the end surface of the second segment 120 on the side of the third segment 130 to the end surface of the third segment 130 on the side of the second segment 120 is represented by a broken line. The upper portion of the fourth segment 140B and the upper portion of the fifth segment 150B form a part of the upper layer 220.

Figure 15:
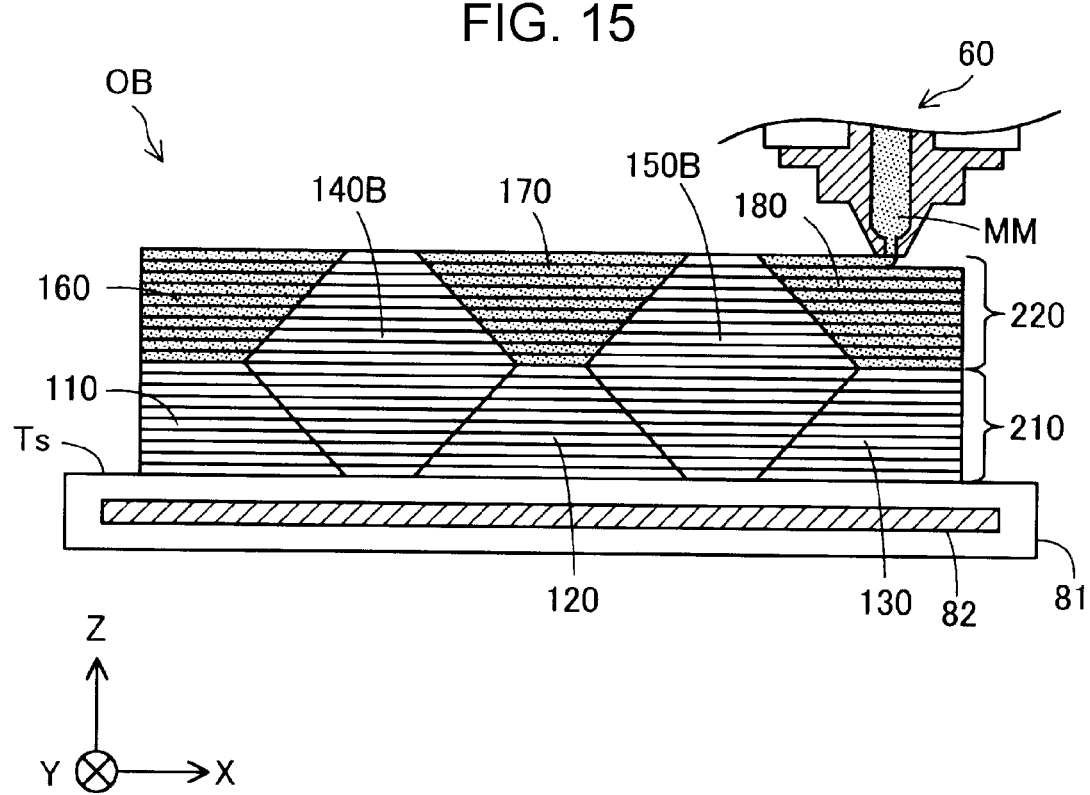
FIG. 15 is a process diagram illustrating a third forming process according to the third embodiment.

FIG. 15 is a process diagram illustrating a third forming process for creating the upper layer 220 of the three-dimensional object OB according to the third embodiment. In the embodiment, a sixth segment 160, a seventh segment 170, and an eighth segment 180 that form a part of the upper layer 220 are created on the cured first segment 110, the second segment 120, and the third segment 130 by a third forming process and a third curing process being performed after the second curing process. In the third forming process, the controller 90 forms the sixth segment 160 that has a form in which the first segment 110 of the lower layer 210 is laminated in a vertically symmetrical manner on the first segment 110 of the lower layer 210 by causing the nozzle 61 to eject the melted forming material toward the forming surface Ts while changing the relative positions of the nozzle 61 and the forming surface Ts through execution of third forming control. The controller 90 forms seventh segment 170 that has a form in which the second segment 120 of the lower layer 210 is laminated in a vertically symmetrical manner on the second segment 120 of the lower layer 210, and forms the eighth segment 180 that has a form in which the third segment 130 of the lower layer 210 is laminated in a vertically symmetrical manner on the third segment 130 of the lower layer 210, similarly to the sixth segment 160. Thereafter, the controller 90 cures the sixth segment 160, the seventh segment 170, and the eighth segment 180 by executing the third curing control that is similar to the first curing control.

According to the method of forming the three-dimensional object OB of the embodiment as described above, a part of the upper layer 220 of the three-dimensional object OB is formed through the second forming process and the second curing process when the lower layer 210 of the three-dimensional object OB is formed, and it is thus possible to omit a part of processes when the upper layer 220 of the three-dimensional object OB is formed. Therefore, it is possible to improve producibility of the three-dimensional object OB.

Also, according to the embodiment, the fourth segment 140B and the fifth segment 150B that form a part of the upper layer 220 of the three-dimensional object OB are first formed in the second forming process and are then cured in the second forming process. Thereafter, the sixth segment 160, the seventh segment 170, and the eighth segment 180 that are remaining parts of the upper layer 220 of the three-dimensional object OB are formed such that the sixth segment 160, the seventh segment 170, and the eighth segment 180 are separated from each other with the fourth segment 140B and the fifth segment 150B interposed therebetween in the third forming process and are then cured in the third curing process. Therefore, warpage is also inhibited in the upper layer 220 of the three-dimensional object OB.

D. Fourth Embodiment

Figure 16:
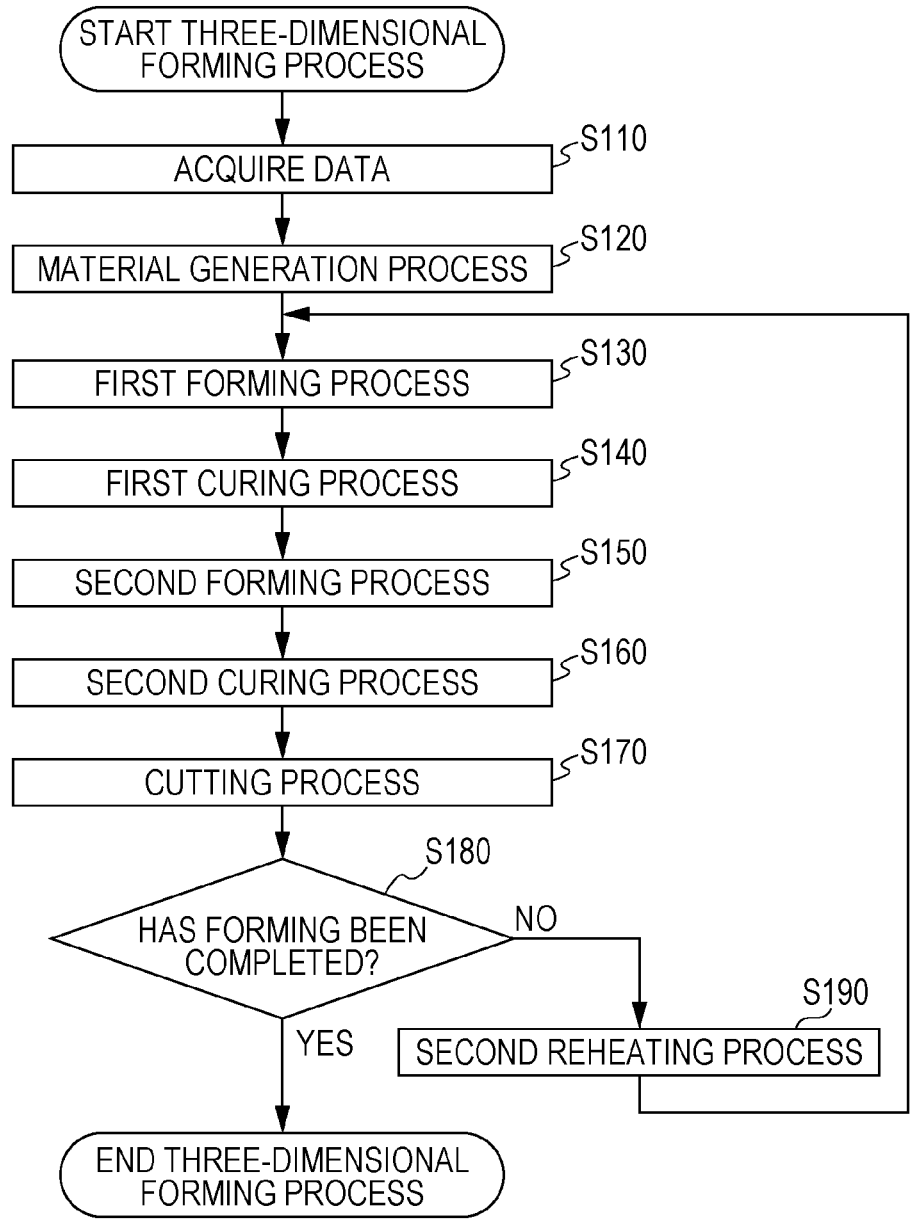
FIG. 16 is a flowchart illustrating details of a three-dimensional forming process according to a fourth embodiment.

FIG. 16 is a flowchart illustrating details of a three-dimensional forming process according to a fourth embodiment. The fourth embodiment is different from the first embodiment in that it is determined whether or not forming of the three-dimensional object OB has been completed in Step S180 after the cutting process in Step S170 and a second reheating process is provided. Other steps are the same as those in the first embodiment.

In Step S180, the controller 90 determines whether or not the forming of the three-dimensional object OB has been completed. Whether or not the forming of the three-dimensional object OB has been completed can be determined using a tool pass data. For example, it is possible to determine whether or not the forming of the three-dimensional object OB has been completed by creating three-dimensional shape data through measurement of the three-dimensional object OB using a three-dimensional digitalizer and matching the created three-dimensional shape data with shape data used for generating the tool pass data. In a case in which it is not determined that the forming of the three-dimensional object OB has been completed in Step S180, the controller 90 forms the upper layer 220 that is a remaining part except for the lower layer 210 of the three-dimensional object OB on the lower layer 210 of the three-dimensional object OB that is formed by the first segment 110 to the fifth segment 150 by repeating the process from Step S130 after performing the second reheating process in Step S190. Meanwhile, in a case in which it is determined that the forming of the three-dimensional object OB has been completed in Step S180, the controller 90 ends the three-dimensional forming process.

Figure 17:
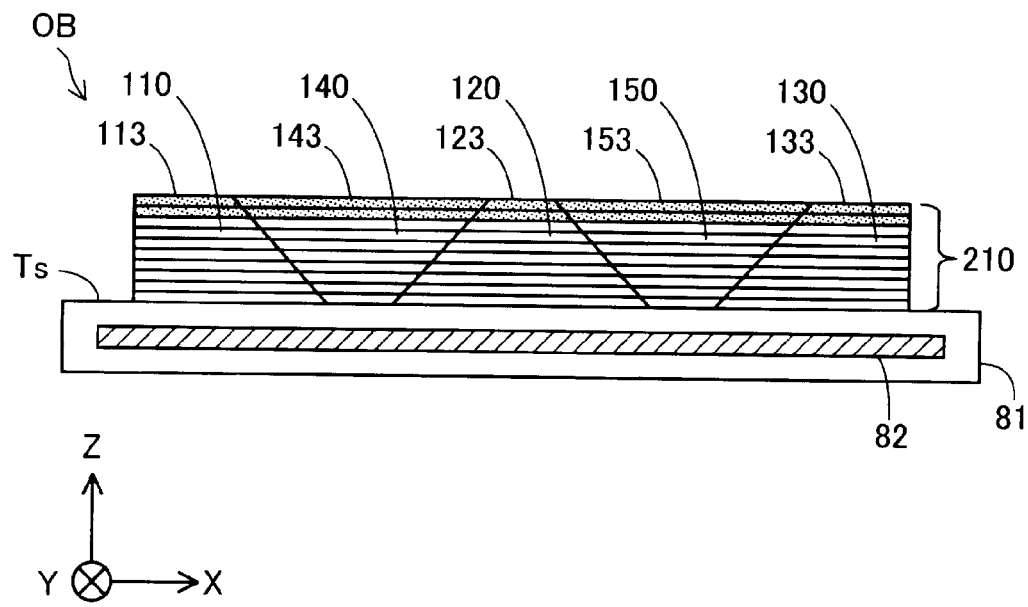
FIG. 17 is a process diagram illustrating a second reheating process according to the fourth embodiment.

FIG. 17 is a process diagram illustrating a second reheating process according to a fourth embodiment. In the second reheating process, the controller 90 heats, with a heater or the like, a first upper surface 113 of the cured first segment 110, a second upper surface 123 of the second segment 120, a third upper surface 133 of the third segment 130, a fourth upper surface 143 of the fourth segment 140, and a fifth upper surface 153 of the fifth segment 150 and melt at least a part of the forming material again through execution of the second reheating control.

Figure 18:
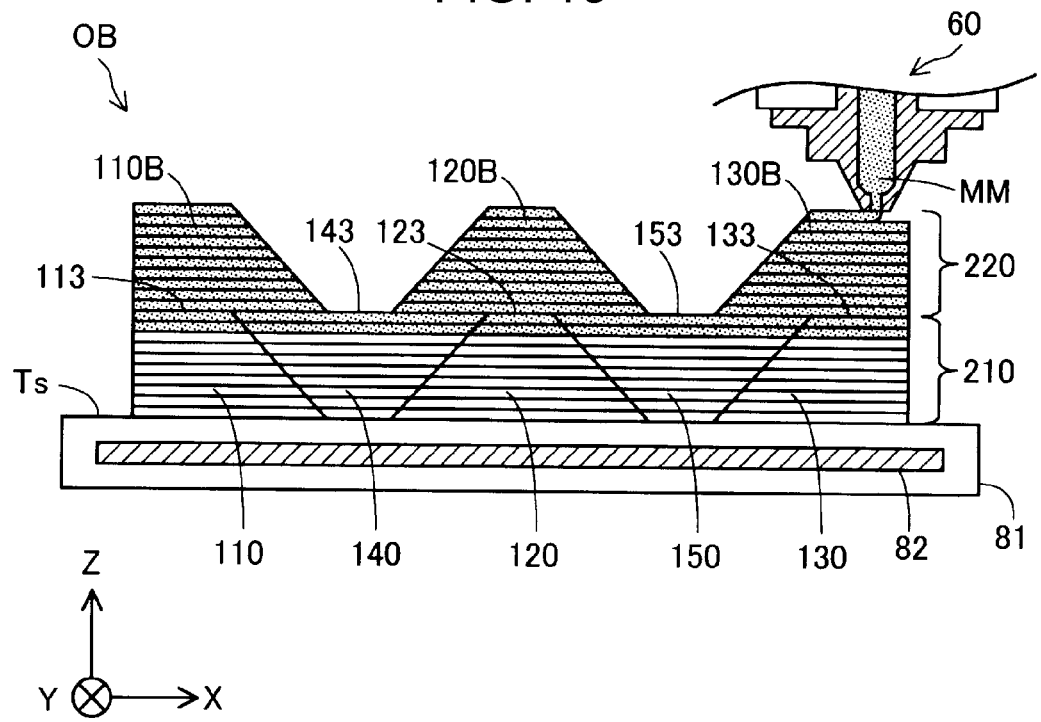
FIG. 18 is a process diagram illustrating a first forming process of an upper layer according to the fourth embodiment.

FIG. 18 is a process diagram illustrating a first forming process for creating the upper layer 220 of the three-dimensional object OB according to the fourth embodiment. After the second reheating process, the controller 90 performs the first forming process for creating the upper layer 220 in a state in which the forming material at the first upper surface 113 of the first segment 110, the second upper surface 123 of the second segment 120, the third upper surface 133 of the third segment 130, the fourth upper surface 143 of the fourth segment 140, and the fifth upper surface 153 of the fifth segment 150 of the lower layer 210 are melted. Details of the first forming process for creating the upper layer 220 are the same as those of the first forming process for creating the lower layer 210.

According to the method of forming the three-dimensional object OB of the embodiment, the upper layer 220 is formed in the state in which the forming material at the respective upper surfaces 113, 123, 133, 143, and 153 of the lower layer 210 of the three-dimensional object OB are melted, and it is thus possible to improve adhesiveness between the lower layer 210 and the upper layer 220.

The three-dimensional forming process according to the embodiment may be combined with the three-dimensional forming process according to the third embodiment. Specifically, the controller 90 may perform the second reheating process after Step S160 in FIG. 13. Also, the three-dimensional forming process according to the embodiment may be combined with the three-dimensional forming process according to the second embodiment. Specifically, the controller 90 may perform the first reheating process between Step S140 in Step S150 in FIG. 16.

E. Other Embodiments (E1) According to the method of forming the three-dimensional object OB of the aforementioned respective embodiments, the first right side surface 112 of the first segment 110, the second left side surface 121 and the second right side surface 122 of the second segment 120, and the third left side surface 131 of the third segment 130 that are formed through the first forming process are inclined relative to the forming surface Ts. In contrast, the respective side surfaces 112, 121, 122, and 131 formed through the first forming process may be vertical relative to the forming surface Ts. That is, the cut surfaces of the first segment 110, the second segment 120, and the third segment 130 cut along surfaces in parallel to the X direction and the Z direction may have rectangular shapes. The "rectangular shapes" have a meaning including substantially rectangular shapes as well as complete rectangular shapes. The "substantially rectangular shape" includes a shape in which a part of a rectangular shape is bent and a shape in which a part of a rectangular shape has irregularity or a step difference. In such a case, the heights of the first segment 110, the second segment 120, and the third segment 130 may be heights with which no interference with the nozzle 61 occurs even if the orientation of the nozzle 61 is not changed in the second forming process.

(E2) According to the method of forming the three-dimensional object OB of the aforementioned respective embodiments, cut surfaces of the first segment 110, the second segment 120, and the third segment 130 formed in the first forming process that are cut along surfaces in parallel to the X direction and the Z direction and the cut surfaces of the fourth segment 140 and the fifth segment 150 formed in the second forming process that are cut along surfaces in parallel to the X direction and the Z direction have polygonal shapes with four or more sides. Meanwhile, the cut surfaces of the first segment 110, the second segment 120, and the third segment 130 formed in the first forming process that are cut along surfaces in parallel to the X direction and the Z direction may be triangular shapes. The "triangular shapes" have a meaning including substantially rectangular shapes as well as complete triangular shapes. The "substantially triangular shapes" include a shape in which a part of a triangular shape is bent and a shape in which a part of a triangular shape has irregularity and unevenness. Also, the cut surfaces of the fourth segment 140 and the fifth segment 150 formed in the second forming process that are cut along surfaces in parallel to the X direction and the Z direction may be triangular shapes.

Figure 19:
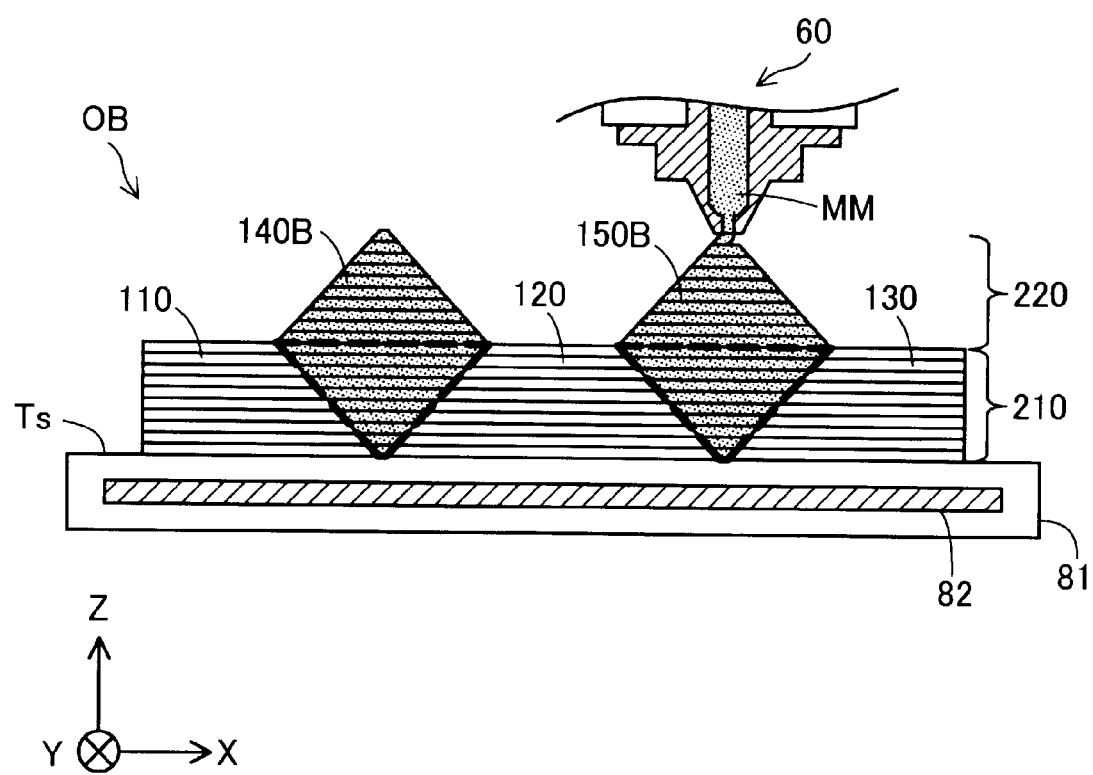
FIG. 19 is a process diagram illustrating a second forming process according to another embodiment.

(E3) According to the second forming process of the aforementioned third embodiment, the fourth segment 140B and the fifth segment 150B are formed such that cut surfaces thereof that are cut along surfaces in parallel to the X direction and the Z direction have hexagonal shapes. Meanwhile, the cut surfaces of the fourth segment 140B and the fifth segment 150B that are cut along the surfaces in parallel to the X direction and the Z direction may not be hexagonal shapes, and the cut surfaces of the fourth segment 140B and the fifth segment 150B that are cut along surfaces in parallel to the X direction and the Z direction may be a diamond shape as illustrated in FIG. 19, for example. The "diamond shape" has a meaning that includes a substantially diamond shape as well as a complete diamond shape. The "substantially diamond shape" includes a shape in which a part of a diamond shape is bent and a shape in which a part of the diamond has irregularity or a step difference, for example. In FIG. 19, the shape of the fourth segment 140B that successively connects the end surface of the first segment 110 to the end surface of the second segment 120 and the shape of the fifth segment 150B that successively connects the end surface of the second segment 120 to the end surface of the third segment 130 are represented by the broken lines. In addition, the cut surfaces of the fourth segment 140B and the fifth segment 150B that are cut along the surfaces in parallel to the X direction and the Z direction may have a pentagonal shape or may have polygonal shapes that are equal to or greater than heptagonal shapes. The "polygonal shapes" have a meaning including substantially polygonal shapes as well as complete polygonal shapes. The "substantially polygonal shapes" include a shape in which a part of a polygonal shape is bent and a shape in which a part of a polygonal shape has irregularity or unevenness, for example. In this case, the fourth segment 140B is formed such that at least one apex of the polygonal shape is located further away from the forming surface Ts than the respective upper surfaces of the first segment 110 and the second segment 120. The fifth segment 150B is formed such that at least one apex of the polygonal shape is located further away from the forming surface Ts than the respective upper surfaces of the second segment 120 and the third segment 130.

(E4) According to the method of forming the three-dimensional object OB of the aforementioned respective embodiments, the thermoplastic forming material is laminated, and the laminated forming material is cooled and cured, thereby creating the three-dimensional object OB. Meanwhile, the method of forming the three-dimensional object OB may be a laser burning scheme. In this case, a forming material that contains metal powder as a main material may be laminated, and the laminated forming material may be irradiated with a laser, thereby curing the three-dimensional object OB.

(E5) According to the method of forming the three-dimensional object OB of the aforementioned respective embodiment, the cutting process is performed after the second curing process. Meanwhile, the timing at which the cutting process is performed may be between the first curing process and the second forming process. Also, the cutting process may not be performed.

(E6) In the three-dimensional forming apparatus 10 according to the aforementioned respective embodiments, the forming material generation unit 30 includes the flat screw 40. Meanwhile, the forming material generation unit 30 may include an in-line screw that is longer than the flat screw 40 in the Z direction instead of the flat screw 40. Also, the three-dimensional forming apparatus 10 may employ an ordinary fused deposition modeling scheme (FDM scheme) in which the flat screw 40 and the in-line screw are not provided. That is, the three-dimensional forming apparatus 10 may have form in which a bobbin around which a filament made of thermoplastic resin is wound is provided, the filament fed from the bobbin into the nozzle is melted with a heater provided in the nozzle, thereby forming the forming material, and the forming material is ejected from the nozzle.

(E7) According to the three-dimensional forming apparatus 10 of the aforementioned respective embodiments, the first segment 110, the second segment 120, the third segment 130, the fourth segment 140, and the fifth segment 150 are disposed on a line in the X direction. Meanwhile, the first segment 110, the second segment 120, and the third segment 130 may be disposed in a staggered pattern, and the fourth segment 140 and the fifth segment may be disposed such that the fourth segment 140 and the fifth segment 150 connects therebetween. In this case, the direction from the first segment 110 to the second segment 120, that is, the longitudinal direction of the fourth segment 140 is the first direction between the first segment 110 and the second segment 120. Also, the direction from the second segment 120 to the third segment 130, that is, the longitudinal direction of the fifth segment 150 is the first direction between the second segment 120 and the third segment 130. Also, in a case in which the three-dimensional object OB formed in accordance with the shape data has a cylindrical shape with a central axis that is perpendicular to the forming surface Ts, for example, the respective segments 110, 120, 130, 140, and 150 may be disposed in a circumferential direction of the cylindrical shape. In this case, the circumferential direction of the cylindrical shape is the first direction. That is, the first direction is a direction in which the formed three-dimensional object OB extends.

F. Other Aspects

The present disclosure is not limited to the above-described embodiments and can be realized in various aspects within a range not departing from the scope of the disclosure. For example, the present disclosure can be realized by the following aspects. For example, the technical features of any one of the embodiments corresponding to the technical features of any one of the aspects described below can be appropriately replaced or combined in order to solve a part or all of the problems of the present disclosure or to achieve a part or all of the effects of the present disclosure. In addition, the technical features may be appropriately omitted unless they are described as essential features in this specification.

(1) According to an aspect of the disclosure, a method of forming a three-dimensional object is provided. The method of forming a three-dimensional object includes: a first forming process of causing a nozzle to eject a forming material onto a forming surface of a forming base and forming a first portion and a second portion such that the first portion and the second portion are away from each other in a first direction in parallel to the forming surface; a curing process of curing the first portion and the second portion; and a second forming process of causing the nozzle to eject the forming material between the first portion and the second portion and forming a third portion that has a shape that successively connects an end surface of the first portion in the first direction to an end surface of the second portion in the first direction, after the curing process.

According to the method of forming a three-dimensional object of this aspect, the third portion is formed and cured such that the first portion and the second portion are connected to each other, after the first portion and the second portion that form the three-dimensional object are formed and cured such that the first portion and the second portion are away from each other. Therefore, it is possible to further inhibit warpage of the three-dimensional object as compared with a case in which a three-dimensional object including a first portion, a second portion, and a third portion is once formed and cured.

(2) In the method of forming a three-dimensional object according to the aforementioned aspect, the end surface of the first portion and the end surface of the second portion in contact with the third portion may be inclined such that the end surfaces are further separated from each other away from the forming surface in a second direction that is perpendicular to the forming surface.

According to the method of forming a three-dimensional object of this aspect, it is possible to inhibit interference of the nozzle with the first portion and the second portion in the second forming process.

(3) In the method of forming a three-dimensional object according to the aforementioned aspect, each of cut surfaces of the first portion and the second portion cut along surfaces in parallel to the first direction and the second direction may have a trapezoidal shape with a bottom side that is longer than an upper side.

According to the method of forming a three-dimensional object of this aspect, it is possible to secure an interval between the first portion and the second portion and thereby to further inhibit interference of the nozzle with the first portion and the second portion in the second forming process.

(4) In the method of forming a three-dimensional object according to the aforementioned aspect, a cut surface of the third portion cut along a surface in parallel to the first direction and the second direction may have a polygonal shape that has four or more sides including a first side in contact with the end surface of the first portion and a second side in contact with the end surface of the second portion, and at least one apex of the polygonal shape may be located further away from the forming surface than surfaces of the first portion and the second portion on a side away from the surfaces on the side of the forming surface in the second direction.

According to the method of forming a three-dimensional object of this aspect, since a part of an upper layer of the three-dimensional object located on a side that is further away from the forming surface than the first portion and the second portion is formed through the second forming process and the second curing process that are performed when a lower layer of the three-dimensional object is formed, it is possible to omit at least a part of the second forming process and the second curing process when the upper layer of the three-dimensional object is formed. Therefore, it is possible to improve producibility of the three-dimensional object.

(5) In the method of forming a three-dimensional object according to the aforementioned aspect, the polygonal shape may be a hexagonal shape.

According to the method of forming a three-dimensional object of this aspect, it is possible to more effectively improve producibility of the three-dimensional object.

(6) The method of forming a three-dimensional object according to the aforementioned aspect may further include: a first reheating process of heating at least either the end surface of the first portion or the end surface of the second portion in contact with the third portion between the curing process and the second forming process.

According to the method of forming a three-dimensional object of this aspect, adhesiveness of the third portion relative to the first portion and the second portion is improved.

(7) The method of forming a three-dimensional object according to the aforementioned aspect may further include: a second reheating process of heating surfaces of at least any of the first portion, the second portion, and the third portion on a side away from surfaces on a side of the forming surface in a second direction that is perpendicular to the forming surface, after curing the third portion, and after the second reheating process, remaining portions other than the first portion, the second portion, and the third portion of the three-dimensional object may be further formed on the surfaces of the first portion, the second portion, and the third portion on the side away from the surfaces on the side of the forming surface in the second direction.

According to the method of forming a three-dimensional object of this aspect, adhesiveness between the lower layer of the three-dimensional object formed before the second reheating process and the upper layer of the three-dimensional object formed after the second reheating process is improved.

(8) The method of forming a three-dimensional object according to the aforementioned aspect may further include: a third forming process of forming portions in contact with the third portion such that the portions are away from each other on the surface of the first portion on the side away from the surface on the side of the forming surface in the second direction and on the surface of the second portion on the side away from the surface on the side of the forming surface in the second direction, after curing the third portion.

According to the method of forming a three-dimensional object of this aspect, remaining portions of an upper layer of the three-dimensional object are formed such that the remaining parts are away from each other with the third portion interposed therebetween, after the third portion that forms a part of the upper layer of the three-dimensional object is formed and cured. Therefore, warpage is also inhibited in the upper layer of the three-dimensional object.

(9) The method of forming a three-dimensional object according to the aforementioned aspect may further include: a process of cutting at least a part of the cured first portion, the second portion, and the third portion, after curing the third portion.

According to the method of forming a three-dimensional object of this aspect, the three-dimensional object is processed through the cutting. Therefore, it is possible to create the three-dimensional object with high dimensional precision.

(10) The method of forming a three-dimensional object according to the aforementioned aspect may further include: a material melting process of melting a material with a rotating flat screw, thereby obtaining the forming material.

According to the method of forming a three-dimensional object of this aspect, the forming material is generated with a small-sized flat screw. Therefore, it is possible to form the three-dimensional object using a small-sized three-dimensional forming apparatus.

The disclosure can also be realized in various aspects other than the method of forming a three-dimensional object. For example, the disclosure can be realized in aspects of a three-dimensional forming apparatus, a method of controlling the three-dimensional forming apparatus, a computer program that realizes the control method, a non-transitory recording medium that records the computer program, and the like.

What is claimed is:

1. A method of forming a three-dimensional object comprising:
    a first forming process of causing a nozzle to eject a forming material onto a forming surface of a forming base and forming a first portion and a second portion such that the first portion and the second portion are separated from each other in a first direction in parallel to the forming surface;
    a curing process of curing the first portion and the second portion;
    a second forming process of causing the nozzle to eject the forming material between the first portion and the second portion and forming a third portion that has a shape that successively connects an end surface of the first portion in the first direction to an end surface of the second portion in the first direction, after the curing process; and
    a first reheating process of heating at least either the end surface of the first portion or the end surface of the second portion in contact with the third portion between the curing process and the second forming process.

2. The method of forming a three-dimensional object according to claim 1, wherein
    the end surface of the first portion and the end surface of the second portion in contact with the third portion are inclined such that the end surfaces are further separated from each other away from the forming surface in a second direction that is perpendicular to the forming surface.

3. The method of forming a three-dimensional object according to claim 2, wherein
    each of the first portion and the second portion has cut surfaces cut along surfaces in parallel to the first direction and the second direction, and each cut surface has a trapezoidal shape with a bottom side that is longer than an upper side.

4. The method of forming a three-dimensional object according to claim 2, wherein
    a cut surface of the third portion cut along a surface in parallel to the first direction and the second direction has a polygonal shape that has four or more sides including a first side in contact with the end surface of the first portion and a second side in contact with the end surface of the second portion, and
    at least one apex of the polygonal shape is located further away from the forming surface than surfaces of the first portion and the second portion on a side away from the surfaces on the side of the forming surface in the second direction.

5. The method of forming a three-dimensional object according to claim 4, wherein
    the polygonal shape is a hexagonal shape.

6. The method of forming a three-dimensional object according to claim 1, further comprising:
    a second reheating process of heating surfaces of at least any of the first portion, the second portion, and the third portion on a side away from surfaces on a side of the forming surface in a second direction that is perpendicular to the forming surface, after curing the third portion, wherein
    after the second reheating process, remaining portions other than the first portion, the second portion, and the third portion of the three-dimensional object are further formed on surfaces away from the surfaces of the first portion, the second portion, and the third portion on the side of the forming surface in the second direction.

7. The method of forming a three-dimensional object according to claim 4, further comprising:
    a third forming process of forming portions in contact with the third portion such that the portions are away from each other on the surface of the first portion on the side away from the surface on the side of the forming surface in the second direction and on the surface of the second portion on the side away from the surface on the side of the forming surface in the second direction, after curing the third portion.

8. The method of forming a three-dimensional object according to claim 1, further comprising:
    a process of cutting at least a part of the cured first portion, the second portion, and the third portion, after curing the third portion.

9. The method of forming a three-dimensional object according to claim 1, further comprising:
    a material melting process of melting a material with a rotating flat screw, thereby obtaining the forming material.

* * * * *